United States Patent [19]
Daggett et al.

[11] Patent Number: 4,851,748
[45] Date of Patent: Jul. 25, 1989

[54] BASIC DIGITAL MULTI-AXIS ROBOT CONTROL HAVING MODULAR PERFORMANCE EXPANSION CAPABILITY

[75] Inventors: Kenneth E. Daggett, Murrysville, Pa.; Eimei M. Onaga, Brookfield Center, Conn.; Richard J. Casler, Jr., Newtown, Conn.; Barrett L. Booth, Brookfield, Conn.

[73] Assignee: Westinghouse Electric Corp., Pittsburgh, Pa.

[21] Appl. No.: 932,991

[22] Filed: Nov. 20, 1986

[51] Int. Cl.[4] ............................................. G05B 19/42
[52] U.S. Cl. ................................. 318/568.2; 901/14; 901/23; 364/513
[58] Field of Search ............. 318/568 A–568 M, 318/568; 364/513; 901/14–19, 23

[56] References Cited

U.S. PATENT DOCUMENTS

| 4,458,188 | 7/1984 | Inaba et al. | 318/568 |
| 4,475,160 | 10/1984 | Inaba | 318/568 X |
| 4,503,507 | 3/1985 | Takeda et al. | 318/568 X |
| 4,547,858 | 10/1985 | Horak | 318/568 |
| 4,549,276 | 10/1985 | Inaba et al. | 318/568 UX |

Primary Examiner—Benjamin Dobeck
Attorney, Agent, or Firm—J. L. Brzuszek

[57] ABSTRACT

A robot is provided with an arm having a plurality of motor driven joints. A power amplifier supplies drive current to each joint motor. Respective digital feedback control loop arrangements generate voltage commands from which signals are generated to operate the power amplifiers.

Digital motor current, position and velocity feedback signals are generated for position, velocity and torque control loops in the digital feedback control loop arrangement. System resource facilities provide general support for the operation of the digital feedback control loops and include three separate communications controllers, a dual port microprocessor interfacing memory, a time stamp clock, a program memory and a nonvolatile data memory.

A system level microprocessor based system or a microprocessor based position/velocity control system executes motion software from the program memory means according to whether the user desires an expanded performance robot control or a basic robot control. In the basic control, only the position/velocity microprocessor system is included and it is coupled to the system resource facilities. In the expanded control, both microprocessor systems are included and both are coupled to the system resource facilities.

18 Claims, 31 Drawing Sheets

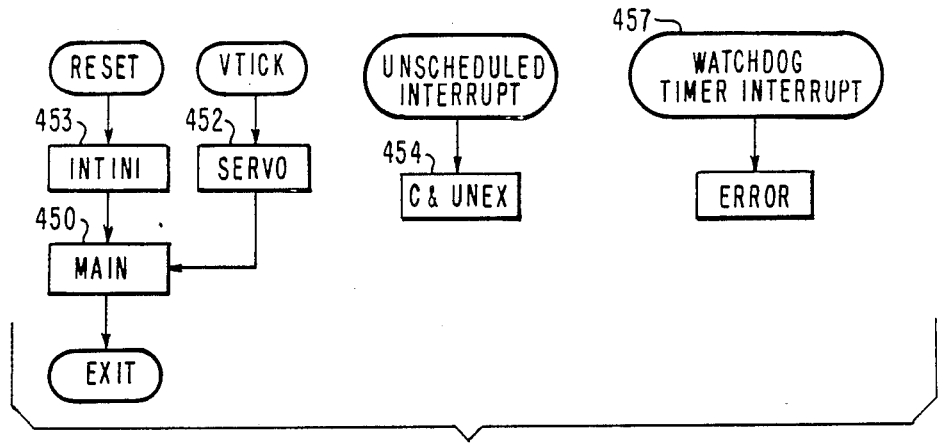
FIG. 8C
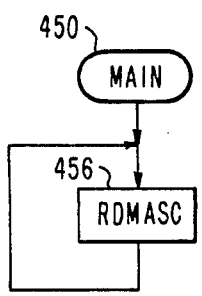
FIG. 8D
FIG. 8E

BASIC DIGITAL MULTI-AXIS ROBOT CONTROL HAVING MODULAR PERFORMANCE EXPANSION CAPABILITY

CROSS REFERENCE TO RELATED APPLICATIONS

The following concurrently filed patent applications each, filed on Nov. 20, 1986 are related to the disclosure of the present application, assigned to the present assignee and are hereby incorporated by reference:

U.S. Ser. No. 932,975 entitled DIGITAL ROBOT CONTROL HAVING AN IMPROVED CURRENT SENSING SYSTEM FOR POWER AMPLIFIERS IN A DIGITAL ROBOT CONTROL and filed by Kenneth E. Daggett, Leonard C. Vercellotti, Richard A. Johnson, Richard J. Casler and Eimei Onaga.

U.S. Ser. No. 932,841 entitled DIGITAL ROBOT CONTROL HAVING AN IMPROVED PULSE WIDTH MODULATOR and filed by Kenneth E. Daggett.

U.S. Ser. No. 932,992 entitled COMMUNICATION INTERFACE FOR MULTI-MICROPROCESSOR SERVO CONTROL IN A MULTI-AXIS ROBOT CONTROL SYSTEM and filed by Kenneth E. Daggett.

U.S. Ser. No. 932,976 entitled DIGITAL ROBOT CONTROL HAVING HIGH PERFORMANCE SERVO CONTROL SYSTEM and filed by Kenneth E. Daggett, Richard J. Casler and Eimei Onaga.

U.S. Ser. No. 932,974 entitled DIGITAL ROBOT CONTROL PROVIDING PULSE WIDTH MODULATION FOR A BRUSHLESS DC DRIVE and filed by Kenneth E. Daggett, Richard A. Johnson, Eimei Onaga and Richard J. Casler.

U.S. Ser. No. 932,853 entitled IMPROVED POSITION AND VELOCITY FEEDBACK SYSTEM FOR A DIGITAL ROBOT CONTROL and filed by Kenneth E. Daggett, Richard J. Casler and Eimei Onaga.

U.S. Ser. No. 932,982 entitled UNIVERSAL ROBOT CONTROL BOARD CONFIGURATION and filed by Richard J. Casler, Eimei Onaga, Vincent P. Jalbert, Barrett Booth, and Kenneth E. Daggett.

U.S. Ser. No. 932,929 entitled IMPROVED DIGITAL CONTROL FOR MULTIAXIS ROBOTS and filed by Kenneth E. Daggett, Richard J. Casler, Eimei Onaga, Barrett Booth, Rajan Penkar, Leonard C. Vercellotti and Richard A. Johnson.

U.S. Ser. No. 932,983 entitled MODULAR ROBOT CONTROL SYSTEM and filed by Kenneth E. Daggett, Barrett Booth, Vincent P. Jalbert, Eimei Onaga and Richard J. Casler.

U.S. Ser. No. 932,977 entitled MULTIPROCESSOR TORQUE SERVO CONTROL FOR MULTIAXIS DIGITAL ROBOT CONTROL SYSTEM and filed by Kenneth E. Daggett, Richard J. Casler and Eimei Onaga.

U.S. Ser. No. 932,990 entitled MULTIPROCESSOR POSITION/VELOCITY SERVO CONTROL FOR MULTIAXIS DIGITAL ROBOT CONTROL SYSTEM and filed by R. Lancraft, Eimei Onaga, Richard J. Casler, Kenneth E. Daggett and Barrett Booth.

U.S. Ser. No. 932,986 entitled MULTIAXIS ROBOT HAVING IMPROVED MOTION CONTROL THROUGH VARIABLE ACCELERATION/DECELERATION PROFILING and filed by Rajan Penkar and Neil Tan.

U.S. Ser. No. 932,988 entitled MULTIAXIS ROBOT CONTROL HAVING CAPABILITY FOR EXECUTING TIMED MOVES and filed by Rajan Penkar.

U.S. Ser. No. 932,985 entitled MULTIAXIS ROBOT CONTROL HAVING IMPROVED CONTINUOUS PATH OPERATION and filed by Rajan Penkar.

U.S. Ser. No. 932,840 entitled MULTIAXIS ROBOT CONTROL HAVING FITTED CURVED PATH CONTROL and filed by Rajan Pankar.

U.S. Ser. No. 932,973 entitled MULTIAXIS ROBOT CONTROL HAVING IMPROVED ENERGY MONITORING SYSTEM FOR PROTECTING ROBOTS AGAINST JOINT MOTOR OVERLOAD and filed by Eimei Onaga.

U.S. Ser. No. 932,842 entitled MULTIAXIS DIGITAL ROBOT CONTROL HAVING A BACKUP VELOCITY MONITOR AND PROTECTION SYSTEM and filed by Eimei Onaga.

BACKGROUND OF THE INVENTION

The present invention relates to robots and more particularly to digital multi-axis robot controls that are widely applicable as a result of control performance expandability.

In the aforementioned cross-referenced patent applications, there is disclosed a new completely digital control for multi-axis robots. The control has a hierarchical task oriented structure that partitions real time sensory interactive control into organized modules. The present invention relates to aspects of the control system structure which enable it to be configured either as a widely applicable basic robot control or optionally as a higher performance robot control by means of modular heirarchical extension of the basic control.

SUMMARY OF THE INVENTION

A robot is provided with an arm having a plurality of motor driven joints. A power amplifier supplies drive current to each joint motor. Respective digital feedback control loop means generate voltage commands from which signals are generated to operate the power amplifiers.

Digital motor current, position and velocity feedback signals are generated for position, velocity and torque control loops in the digital feedback control loop means. System resource means provide general support for the operation of the digital feedback control loop means and include data communicating means for interfacing with local input/output devices and other systems and devices.

First microprocessor servo means are coupled to the system resource means and generate the voltage commands in response to position commands and the current, position and velocity feedback signals. Means are provided for generating the position commands in accordance with predefined moves set forth in a robot program. The position command generating means includes planning program means for generating a motion profile with specified motion parameters for implementing each robot program command and trajectory program means for generating the position commands to satisfy each robot program command in accordance with its motion profile.

Second microprocessor means are adapted to be coupled to the system resource means. The position command generating means further includes the first microprocessor servo means for execution of the planning and trajectory program means in a basic robot control configuration or the second microprocessor means for execution of the planning and trajectory program means in an expanded performance robot control configuration.

Interfacing memory means couples the first and second microprocessor means for data communications therebetween when the expanded control configuration is employed.

BRIEF DESCRIPTION OF THE DRAWINGS

FIGS. 6A1-A2 show a schematic diagram of a servo control board (SCM) which is a part of the robot basic control included in FIG. 5A.

FIG. 8A1-A2 show a data flow and timing diagram for SCM and torque processor boards;

FIG. 8B-8I show flow charts for programming executed on the SCM board;

FIGS. 8J-8L2 show flow diagrams for motion programming executed on either the SCM board or the system control board;

FIGS. 9A1-9D4 show schematic diagrams of circuitry on the system control board in greater details.

DESCRIPTION OF THE PREFERRED EMBODIMENT

Robots—Generally

Robot capabilities generally range from simple repetitive point-to-point motions to complex motions that are computer controlled and sequenced as part of an integrated manufacturing system. In factor applications, robots can perform a wide variety of tasks in various manufacturing applications including: die casting, spot welding, arc welding, investment casting, forging, press working, spray painting, plastic molding, machine tool loading, heat treatment, metal deburring, palletizing, brick manufacturing, glass manufacturing, etc. For more complete consideration of robots and their uses, reference is made to a book entitled "Robotics In Practice" published in 1980 by Joseph F. Engelberger.

To perform work within its sphere of influence, a robot typically is provided with an arm, a wrist subassembly and an end effector. The coordinate system employed for the robot arm typically is Cartesian, cylindrical, polar or revolute. Generally, three motion axes are employed to deliver the wrist subassembly anywhere within the sphere of influence and three additional motion axes are employed for universal orientation of the end effector. A drive system is used for each motion axis, and it may be electrical, hydraulic or pneumatic.

PUMA ROBOT

Figure 1:
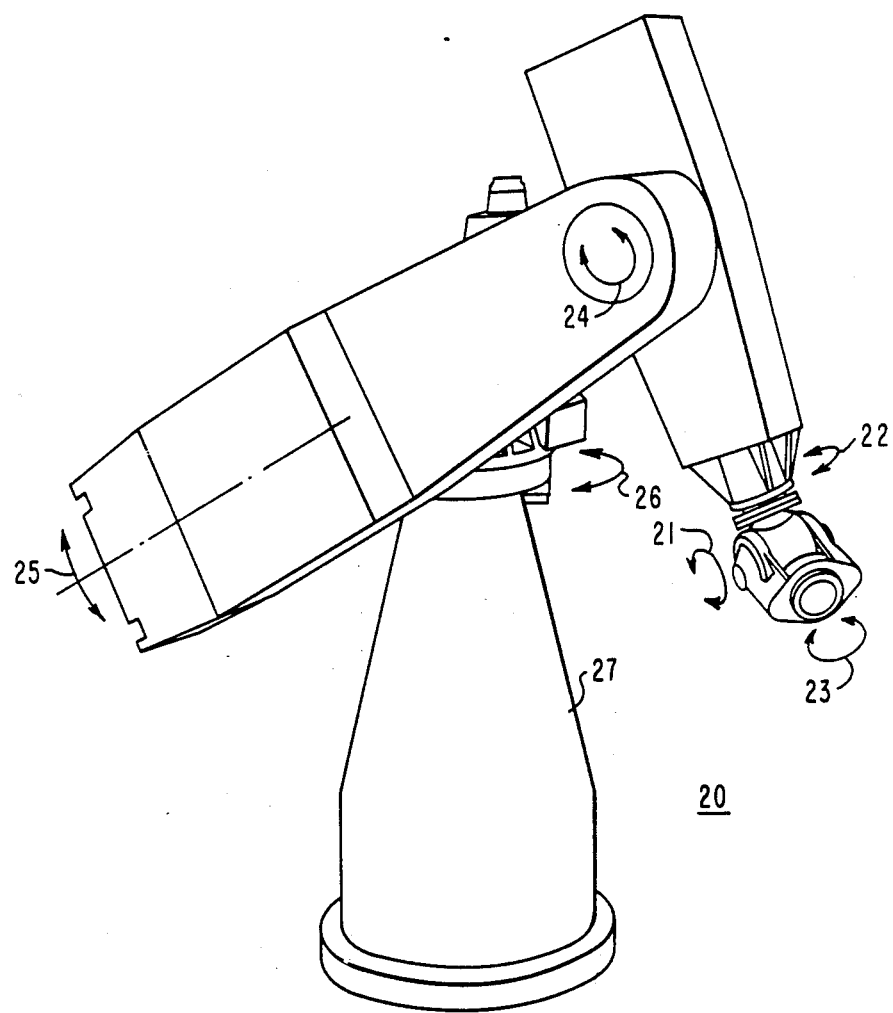
FIG. 1 shows a perspective view of a robot which is operated with more advanced and more accurate performance when controlled by a system making use of the invention.

More particularly, there is shown in FIG. 1 a six-axis industrial electric robot 20 which is illustrative of a wide variety of robots that can be operated in accordance with the principles of the invention. The robot 20 is a relatively powerful electric robot sold by Unimation Company, a wholly-owned company of the present assignee, under the trade name UNIMATE PUMA SERIES 700. The Model 761 PUMA has a 22 pound payload capacity and a reach of 59.1 inches. The Model 762 PUMA has a 44 pound payload capacity and a reach of 49.2 inches.

PUMA 700 Series robots are designed with flexibility and durability to ensure long life and optimum performance in even the harshest, most demanding manufacturing environments. Specific customer needs for either higher payload or extended reach determine which model is suitable for a particular task.

With its longer reach, the PUMA 761 is ideally suited for precise, repetitive tasks such as arc welding and sealant dispensing. The PUMA 762 performs high-precision material handling, machine loading, inspection, testing, joining and assembly in medium and heavier weight applications. The PUMA robots occupy minimal floor space, yet a large work envelope allows the robots to service multiple machines and work surfaces.

Each axis motion is generated by a brush type DC electric motor, with axis position feedback generated by incremental encoders. As shown, the wrist is provided with three articulations, i.e., an up/down rotation indicated by arrow 21 and a left/right rotation indicated by arrow 22 and a third arm motion indicated by arrow 23. Elbow and shoulder rotations in the up/down direction are respectively indicated by arrows 24 and 25. Finally, a left/right arm rotation on a base 27 is indicated by arrow 26.

ROBOT CONTROL

The present invention is directed to a robot control 30 (FIG. 2, 3, or 4) which can operate the robot 20 of FIG. 1 and other robots including the larger Unimation 860 robot which employs brushless DC axis motors and absolute position feedback. Generally, however, the robot control 30 is universally and flexibly applicable to differing kinds of sizes of robots in stand alone or robotic network operation.

As a result of its universality, the control 30 can be arranged to operate a complete family of robots. Thus, all hydraulically and electrically driven robot arms manufactured by Unimation, a company of Westinghouse, assignee of the present invention, can be operated by the control 30. The key to the family usage, or more generally the universality of the control 30 lies in modularization and in minimizing the use of arm dependent hardware and avoiding the use of any arm dependent hardware in as much of the modular control structure as possible. The robot control 30 is identified by the acronym UNIVAL and operates with completely digital servo control to provide better robot performance with lower cost.

CONTROL LOOPS

Figure 2:
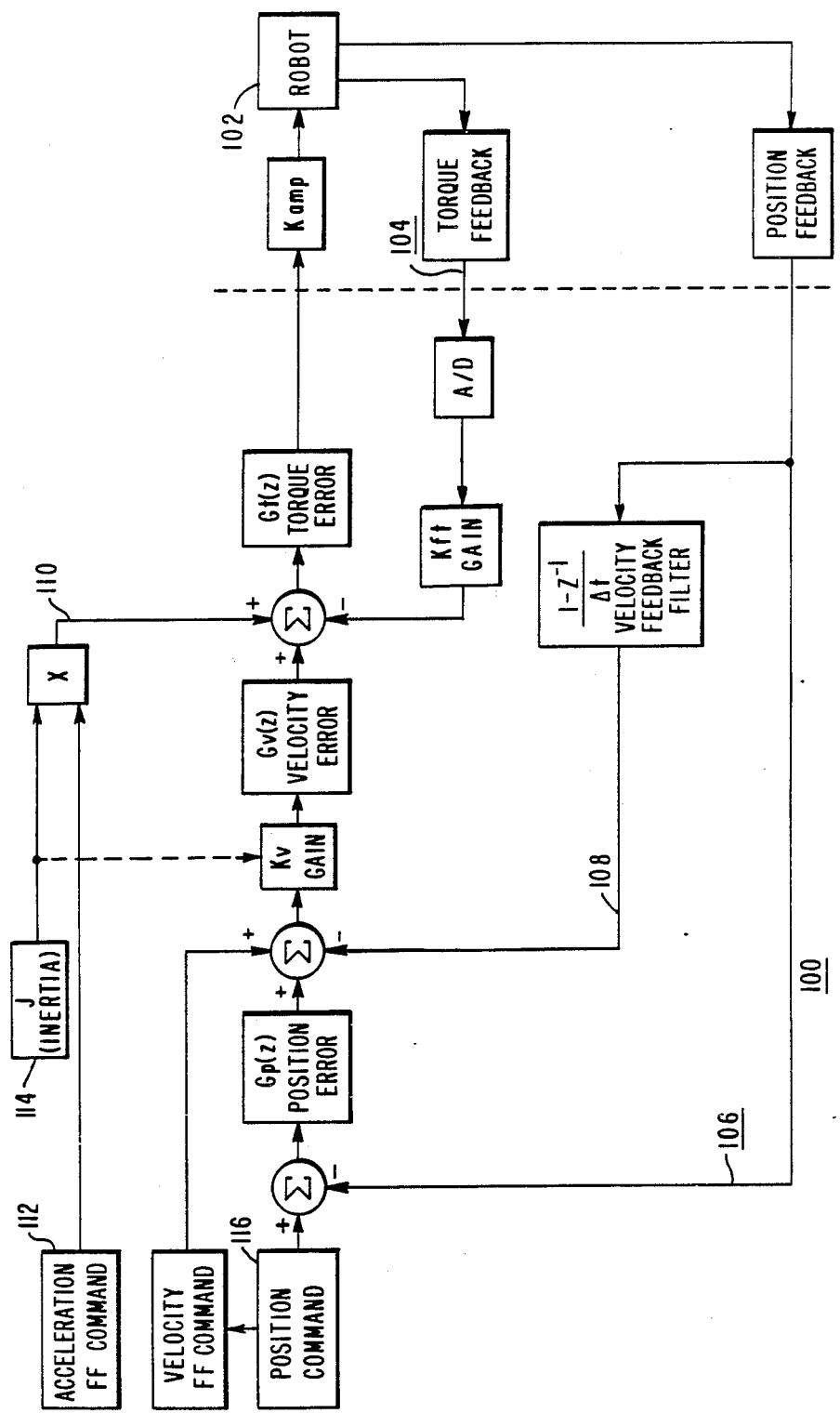
FIG. 2 shows a generalized block diagram of a control loop arrangement employing position, velocity and torque control loops in which the invention may be embodied.

In FIG. 2, there is shown an embodiment of a generalized control loop configuration 100 employable in the UNIVAL TM robot control. Thus, each robot arm joint motor 102 is operated by a torque control loop 104. An outer position control loop 106 is tandem connected to a velocity control loop 108 which in turn drives the torque control loop 104. A feedforward acceleration control loop 110 is responsive to acceleration command 112 and arm and load inertia 114 is also directly coupled to the input of the torque control loop 104. The robot arm is operated by the control loop 100 in accordance with a robot program through a stream of program position commands 116 applied to the position control loop.

Figure 3:
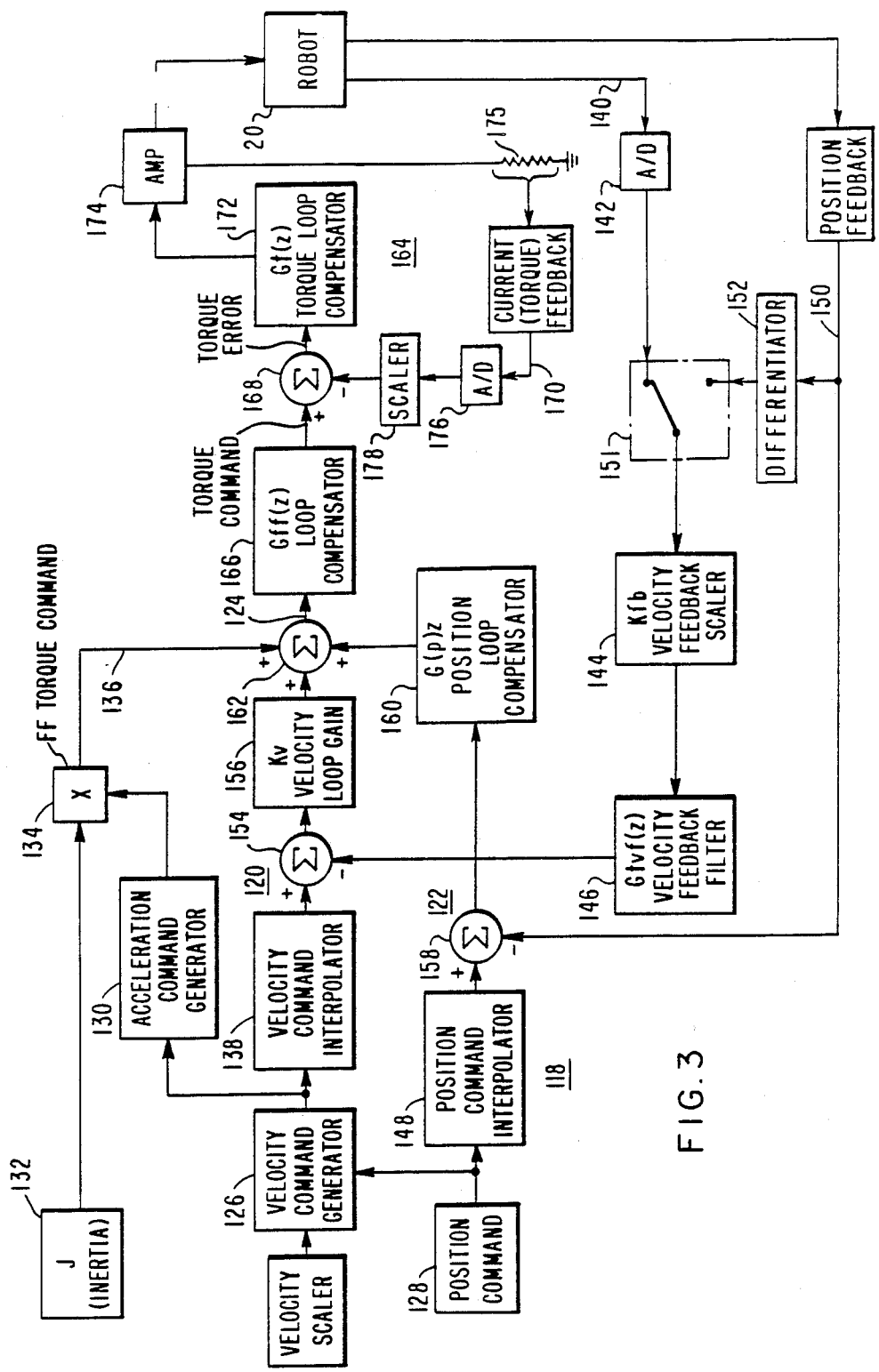
FIG. 3 shows a more detailed block diagram of a control loop arrangement employed position, velocity and torque control loops in which the invention preferably is embodied.

FIG. 3 shows the preferred generalized control loop configuration 118 presently employed in the robot control. It is preferably implemented as a completely digital control. With the provision of hierarchical architecture and multiprocessor architecture and floating point hardware as described herein or in other patent applications referenced above, the trajectory cycle can be characterized with a cycle time in the range of 32 to 8 milliseconds depending on the employed modular configuration.

In the preferred control loop arrangement 118, position control loop 22 and velocity control loop 120 are parallel feed to the input of a torque control loop 124. Velocity commands are generated by block 126 from position commands received by block 128. In turn, feedforward acceleration commands are generated by block 130 from the velocity commands. Computed inertia (load and arm) 132 is multiplied against the acceleration command as indicated by reference character 134 in the feedforward acceleration control loop 136.

In the velocity loop 120, the velocity command in the present embodiment is generated once every 8 to 32 milliseconds depending on the modular configuration of the robot control. The basic robot control described subsequently herein has a trajectory cycle time of 32 milliseconds while the enhanced contact has a trajectory cycle of 8 milliseconds.

In any case, a velocity command generator 126 interpolates velocity commands at the rate of 1 each millisecond which corresponds with the velocity feedback sampling rate in velocity feedback path 140. As shown, velocity feedback for a Unimation 860 robot is produced by tachometer signals which are converted from analog to digital by converter 142. A scaler 144 and a filter 146 supplement the velocity feedback circuitry.

Similarly, in the position control loop 122, an interpolator 148 generates position commands every millisecond in correspondence with the position feedback sampling rate in feedback path 150. In the Unimation 860 robot control, position feedback is absolute and the velocity and position feedback paths 140 and 150 operate as just described (with switch 151 as shown). For Unimation PUMA robots, tachometers are not available and velocity feedback is computed from incremental position feedback as indicated by block 152 (with the switch 151 swinging to its other position) as described more fully in referenced applications Ser. Nos. 932,841 and 932,853.

Velocity error is generated by summer 154 with gain applied by loop 156. Similarly, position error is generated by summer 158 with gain applied by box 160.

Velocity and position errors and feedforward acceleration command are summed in summer 162. Gain is applied to box 166 in generate a torque command which is applied to the input of torque control loop 164 every millisecond. Torque error is generated in summer 168 by summing the torque command (motor current command) with current feedback from feedback path 170. Box 172 applies a torque loop gain to the torque error (motor voltage commands) and pulse width modulated (PWM) output signal (motor voltage commands) are applied to a power amplifier 174 which supplies the motor drive current for robot joint operation. Current feedback from a resistor 175 is sampled every 250 microseconds (see referenced patent application Ser. No. 932,975 and converted to digital signals by box 176 with scaling applied by box 178.

OVERVIEW—ELECTRONIC BOARDS

Figure 4:
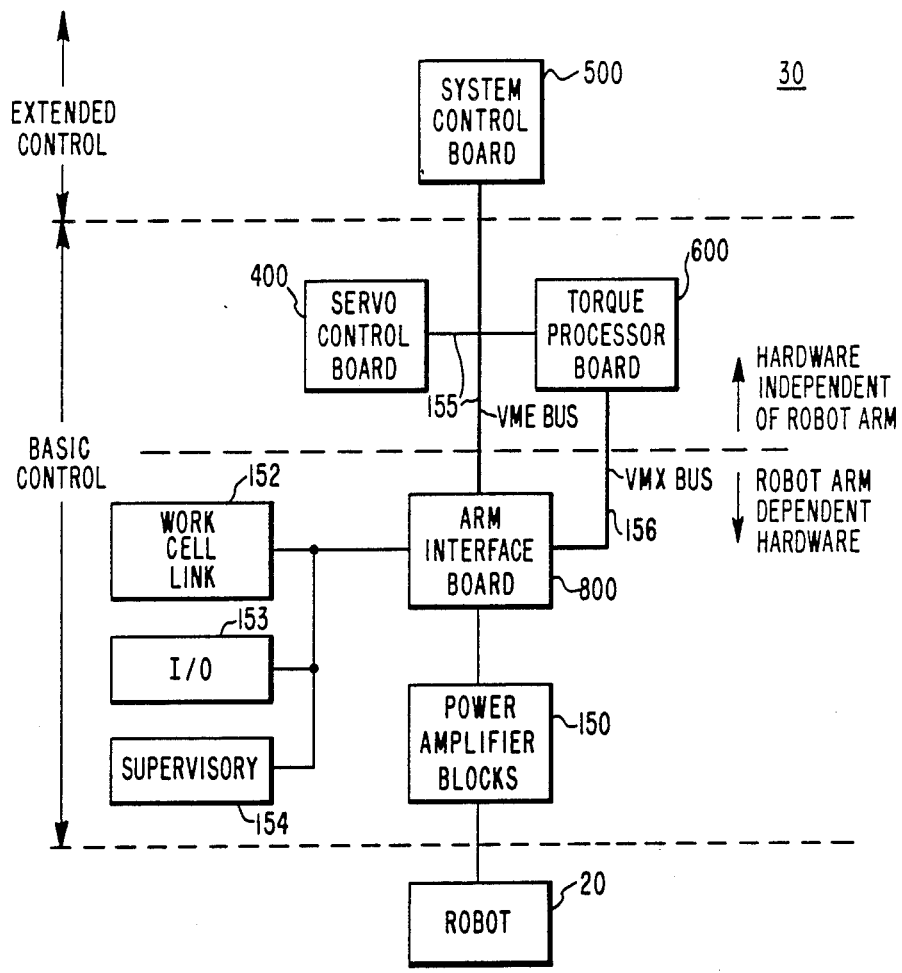
FIG. 4 shows an overview of an arrangement of electronic boards on which circuitry is arranged to implement the robot control system including the pulse width modulation circuitry of the present invention.

Implementation of the control looping for the robot control 30 in FIG. 4 is achieved by the uses of digital control circuitry disposed on a plurality of electronic boards. The organization of the circuitry on the boards and the partitioning of programming among various microprocessors enables advanced robot control performance to be achieved with a modular control configuration characterized with economy of manufacture, facilitates variability of configuration which enables universality of uses, and flexibility in choice of level of control performance.

As shown in FIG. 4, the control board configuration includes an arm interface board 800 which preferably houses all circuitry dependent on the type of robot arm being controlled. For example, position feedback circuitry will differ according to whether absolute or incremental position feedback is used by the robot arm to be controlled. Thus, two or possibly more varieties of the arm interface board 800 can be employed to provide digital control systems for any of a variety of different sizes or types of robot arms. Any particular robot arm would require use of the arm interface board which is structured to work with that robot arm.

The arm interface (AIF) board 800 also houses generic circuitry such as VME bus control circuitry which is generally related to two or more boards and not to any one board in particular.

Control signals (pulse width modulated) are generated from the AIF board 800 to control power amplifier blocks 150 which supply motor currents to the robot joint motors. The AIF board 800 also operates as a channel for external coupling of the robot control 30 to other robot controls in a work cell as indicated by the reference character 152, to programmable controllers and other input/output devices 153 in an area network and to higher level computers 154 for supervisory control.

A torque processor (TP) board 600 and a servo control board 400 are generic circuit boards used with the AIF board 800 and power amplifier blocks 150 in all robot control systems for all robot types. The three circuit boards 400, 600 and 800 provide complete 6 axis control for a robot arm and thus form a basic control configuration for the UNIVAL ™ robot control family as well as other robot controls.

The torque processor board 600 provides motor torque control in response to commands from the servo control board 400. In turn, the servo control board 400 provides arm solutions and position and velocity control in accordance with a robot control program.

Extended control capability and/or system functioning is achieved by interconnecting additional electronic boards or devices to the basic control 400, 600, 800. For example, with the addition of a system control board 500 and partitioning of predetermined program functions including the arm solutions from the servo control board 400 to the system control board 500, the UNIVAL ™ robot control can operate the robot 20 and other robots with significantly faster control action, i.e., with the trajectory cycle shortened from thirty-two milliseconds to eight milliseconds.

Interboard data communications for control and other purposes occur over multiple signal paths in a VME bus 155. Additionally, a VMX bus 156 is provided for connection between the torque processor board 600 and the AIF board 800.

Multiple pin interconnectors (not shown in FIG. 4) are provided on the AIF, TP and SCM boards and any other connectable units to facilitate VME and VMX interboard bus connections modular and board assembly for the robot control 30. Other connectors are provided on the AIF board 800 for external input/output connections.

More detail on the board circuit structure is presented herein or elsewhere in the writeups for the cross-referenced patent applications.

OVERVIEW—MODULARLY EXPANDABLE BASIC ROBOT CONTROL

Figure 5A:
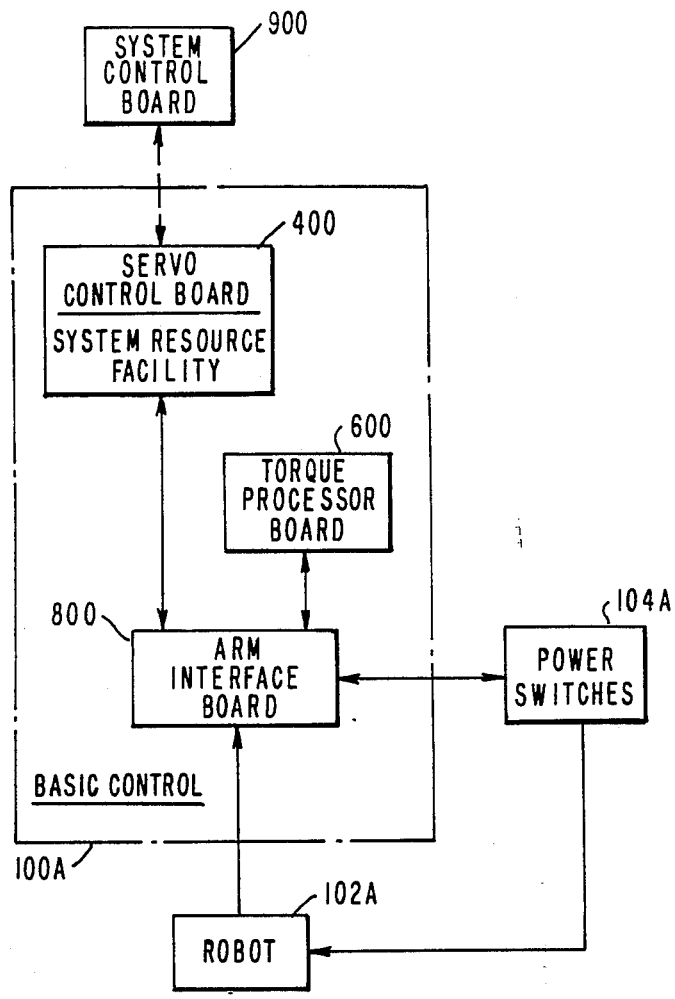
FIG. 5A shows a block diagram of a basic robot control with an optional modular extension which provides higher control performance in accordance with the present invention.
Figure 5B:
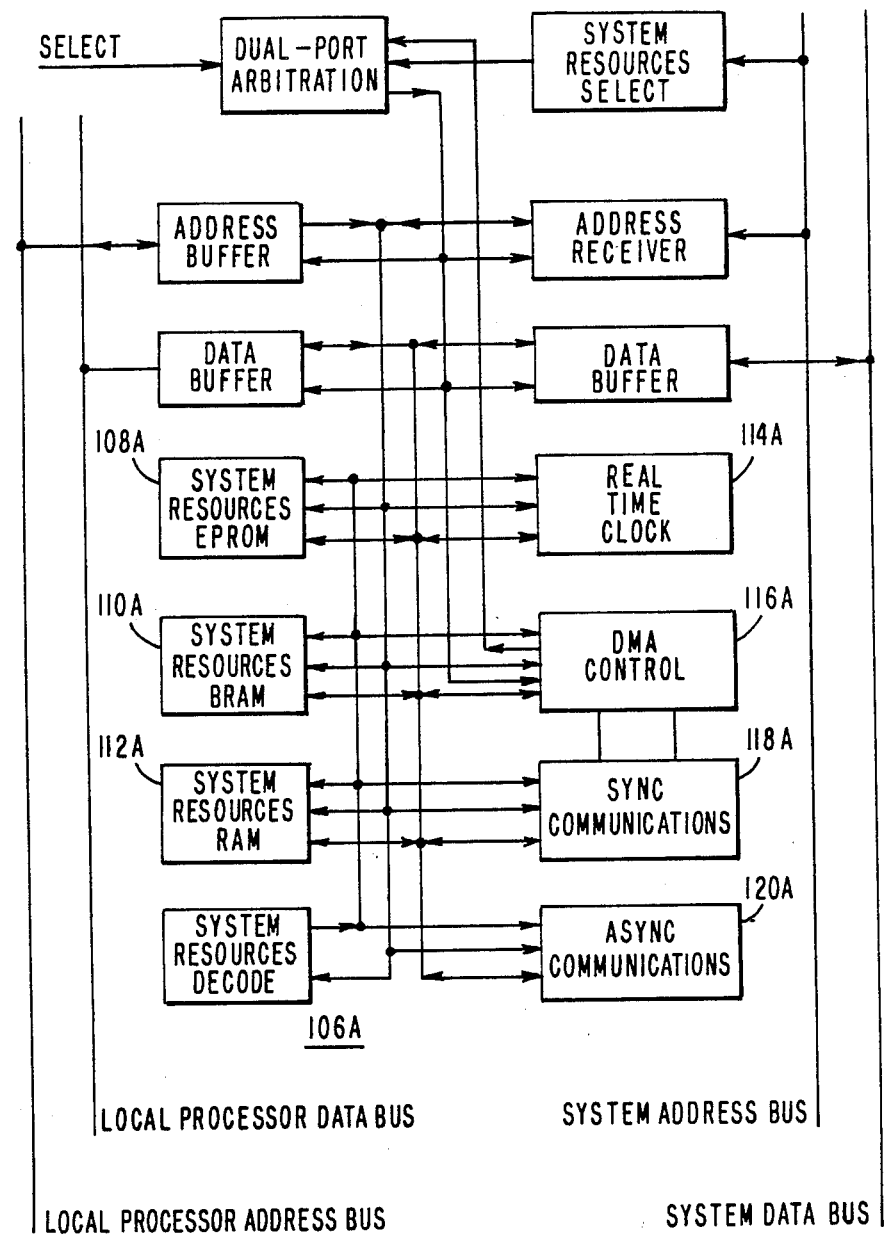
FIG. 5B shows a block diagram of a system resource facility employed as part of the basic control of FIG. 5A.

As shown in FIG. 5A, a basic robot control 100A is configured with a servo control board 400, a torque processor board 600 and an arm interface board 800 to provide stand alone control for a robot 102A through power switches 104A. The basic robot control 100A has stand alone control capability as a result of the fact that it includes a system resource facility 106A shown in FIG. 5B in this instance on the servo control board 400. In providing stand alone robot control, the basic control 100A provides complete implementation of supervisory control, planning, trajectory calculations, arm solutions, and position and velocity and torque loop closure.

Generally, the system resource facility 106A (FIG. 5B) provides functions related to the overall robot control system and required for direction and support of control loop operation but not specifically related to the position and velocity control looping on the SCM board 400 nor the torque control loop on the torque processor board 600. At the same time, the system resource facility and the SCM board circuitry are organized in such a manner that certain portable resource functions can be removed from the SCM board 400 for performance at a higher control level thereby enabling the basic control system to operate with a higher performance capability.

Specifically, the trajectory cycle time can be shortened with the expanded control, for example from 32 milliseconds to 8 milliseconds. In this instance, it is preferred that the portable resource functions be performed on the system control board 900 which can be simply plugged into the arm interface board 800 along with the SCM and TP boards 600 and 800.

More particularly, the system resource functions are implemented in a dual port memory configuration and include EPROM 108A, battery back-up RAM 110A for storage of non-volatile data, static RAM 112A, a real-time clock 114A, and a communications facility which includes a DMA controller 116A and two multi-protocol, dual channel communications controllers 118A and 120A.

With dual port memory operation, equal access is provided to the system resource section from either the local SCM processor or from the system bus (i.e., a higher level processor such as one on the system control board 900). Since the system resource functions serve as slave devices to the system bus, these facilities and their functions can be controlled either from the SCM local processor or from an optional higher level processor connected to the system bus. Operation of these facilities by an optional processor, or processors, with capability of serving as a system bus master permits the SCM local processor to be freed from the related processing tasks. Thus, robot control systems with varying levels of performance and functionality can be implemented cost effectively.

The SCM board 400 is structured to provide as much system flexibility as is reasonably possible and to make high use of available Large Scale Integrated (LSI) circuitry. This is one of the reasons that the DMA and communications facilities are implemented in the system resource area as opposed to being directly connected to the local processor bus. This architecture not only frees the local processor from direct intervention in communications data movement, it also eliminates the local processor bus communications related overhead, thus allowing high speed serial communications to be conducted without significant impact on controlling processor program execution time.

The system resource EPROM 108A stores the robot arm solutions program and associated constants. Incorporation of this feature into the system resource area permits robot control systems with varying degrees of performance to be implemented. Thus, the arm solutions program is available to either the SCM local processor for trajectory calculations in low cost systems, or it is made available to an optional processing module in higher cost and higher performance systems.

The system resource battery backed-up RAM 110A provides storage for non-volatile data, such as error information that is made available to the system in general. The system resource static RAM 112A is used for implementation of communications and as an interface vehicle between the SCM and other optional, higher level controlling processors.

The system resource real-time clock provides a general purpose facility for time stamping various processes within the robot controller. The system resource communications facility provides an interface between the robot controller local I/O devices (including operator panel, CRT's, etc.) and peripheral controllers, and provides an interface to other robot controllers or a higher level robot controller in work cell applications The system resource facility 106A provides a total of four communications channels. These channels are implemented through two multi-protocol communications controllers. Two of the communications channels can be used for BIT-BUS or other SDLC communications, and two of the channels are strictly intended for asynchronous communications. The distinction between these channels relates to implementation of support circuitry required to facilitate BIT-BUS and high baud rate serial communications.

The four channel DMA controller is dedicated for use with one of the communications controllers. This provides full duplex serial communications on two communications channels. These communications channels can be operated in either synchronous or asynchronous modes without requiring processor intervention for transfer of data. The other communications controller is intended strictly for operation in the asynchronous mode.

A significant implementation feature of the system resource facility relates to arbitration for access to system resource devices and control of the access. There are three sources of request for system resource access: the SCM local processor, the system bus and the DMA controller.

The DMA controller is implemented within the system resource area. Priority for granting access, when simultaneous requests are present, is dynamically controlled. Dynamic priority allocation ensures that the DMA controller is granted every other system resource access bus cycle and that the local processor and the system bus are each granted one out of every three system resource access bus cycle. This ensures that no single requester will be able to completely absorb system resource access. As a result, the DMA controller has to wait at most one system resource access cycle; and the local processor or system bus has to wait at most two system resource access bus cycles before its request is granted.

With one exception, granting access to the DMA controller automatically results in the system bus being given the highest priority, followed by the local processor, for the next system resource access cycle. Also, granting access to either the local processor or the system bus automatically results in the requester receiving service being assigned the lowest priority with the DMA controller being assigned the highest priority Since granting access to the DMA controller normally results in the system bus being assigned the highest priority, special care must be taken to prevent alternate DMA and system bus requests from locking out local processor request. Thus, a system bus access followed by a DMA access results in the local processor being granted the highest priority for the next access.

IMPLEMENTATION CIRCUITRY AND PROGRAMMING IN GREATER DETAIL

A servo control module (SCM) or board 400 in FIG. 4 (also shown in FIGS. 6A1–A2) is structured in accordance with the modular architecture of the robot control system to operate as a core board for complete basic robot control and generate arm solutions from stored robot program commands or to operate as part of an expanded robot control and receive for implementation arm solutions produced from robot program commands by the higher level system control board 500. The generation of arm solutions involves the execution of robot control functions including robot program language interpretation, path planning, trajectory calculations (intermediate position commands and axis coordination) and transformation of position information between Cartesian (or world robot tool) and robot joint coordinate systems. The SCM board 400 of FIG. 4 additionally provides communications interfacing with related peripherals and a host controller if provided.

The SCM board 400 is provided with program controlled digital circuitry to implement arm motion control loops for the robot control system. Motion control is achieved for each axis through a control loop arrangement which preferably includes interrelated position, velocity, and acceleration control loops from which torque commands are developed for implementation by the torque processor module 600. The digital servo control is a coordinated multiprocessor servo control that generates output torque commands from (1) position and velocity commands provided for each axis by the arm solution and (2) position and velocity feedback signals obtained from the position encoders and the tachometers through the arm interface module 800.

In the SCM control loop operation, a position error is calculated for each axis from the applied axis position command and the axis position feedback. A velocity error is calculated for each axis from a velocity command derived from successive position commands and from the axis velocity feedback. Preferably, the position and velocity control loops are operated in parallel, i.e., the position and velocity errors are summed to produce a torque command for the torque control loop on the torque control module 600. Additionally, an acceleration command preferably is derived from successive velocity commands and applied in a feedforward acceleration control loop which generates an acceleration based torque command for summation with the position and velocity errors in generating the SCM output torque command.

The frequency with which loop calculations are made is selected to produce robot arm motion which is fast, accurate, smooth and stable. For example, the frequency employed can be such as to provide a trajectory cycle of 32 milliseconds as in the present case. If desired, a faster trajectory cycle, i.e., as short as 8 milliseconds, can be achieved.

SCM DIGITAL CIRCUITRY

Figures 1, 6A:
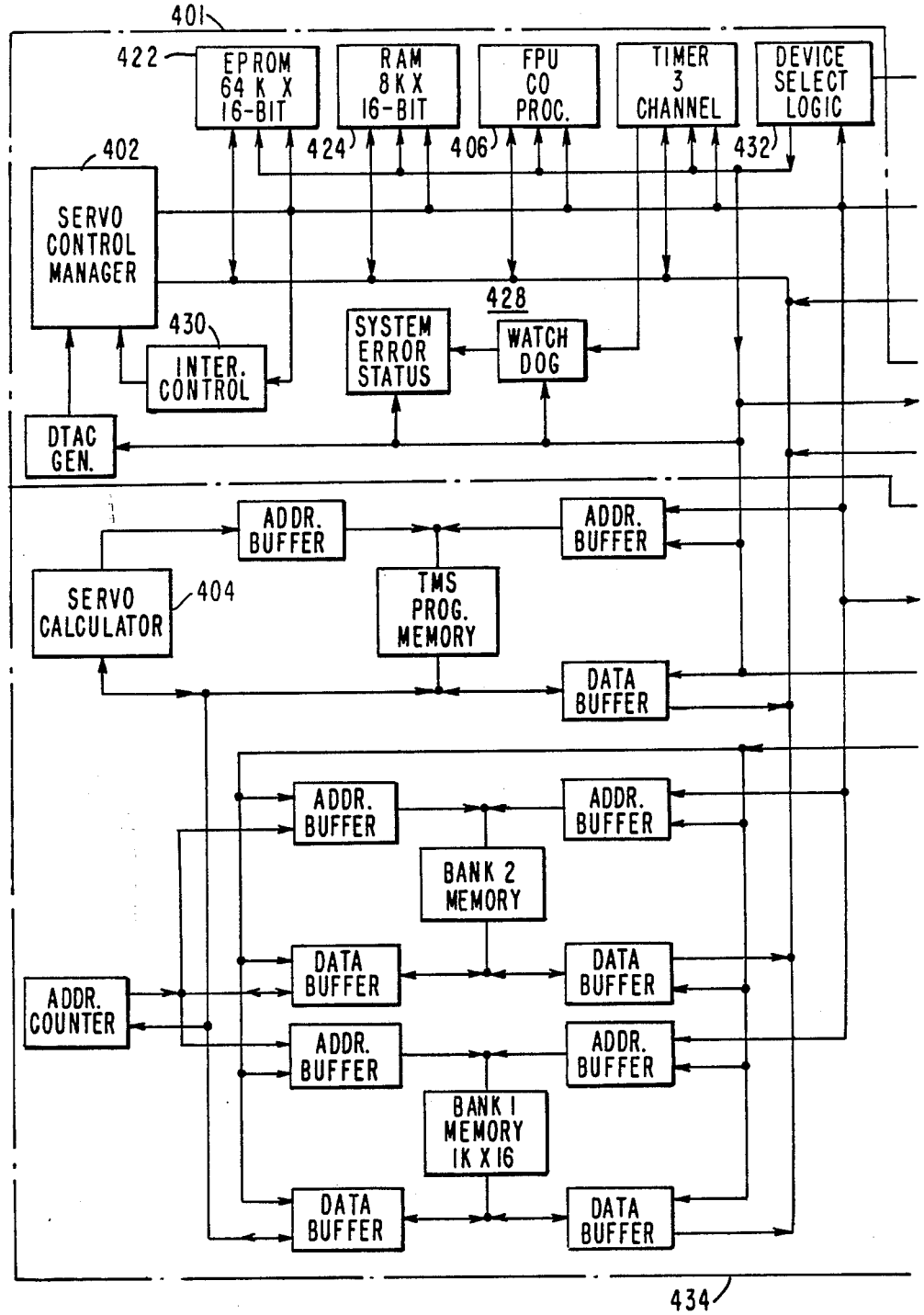
Figures 2, 6A:
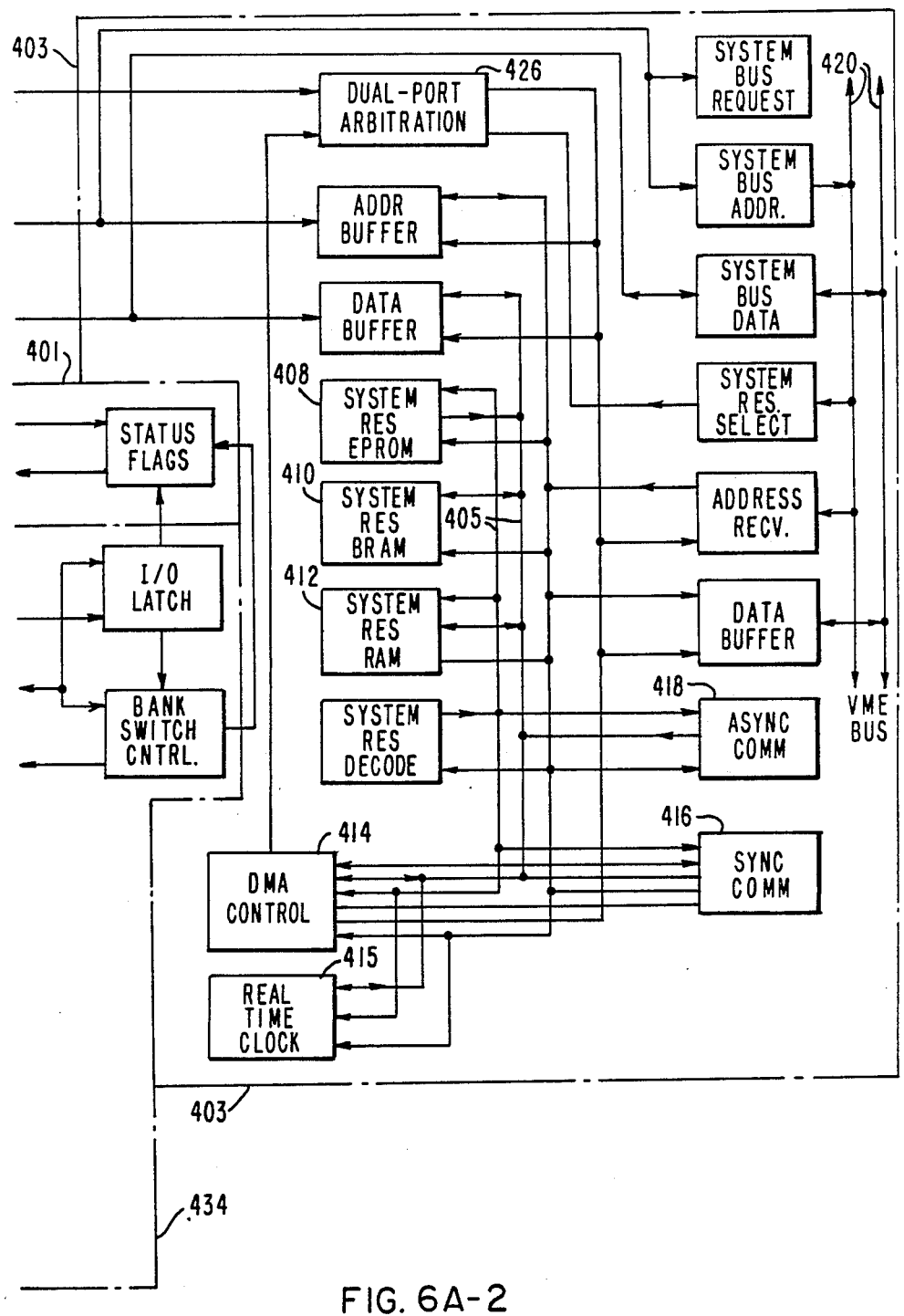

As observed in FIGS. 6A1–A2, the SCM board 400 of FIG. 4 generally comprises two sections, i.e., a local processor section 401 and a system resource section 403. The system resource section 403 employs a bus 405 and provides functions related to the overall robot control system and not specifically related to execution of the position and velocity control loops.

These functions include EPROM 408 for storage of the robot arm solutions, battery backed-up RAM 410 for storage of non-volatile data, static RAM 412 realtime clock 415, a DMA controller and two multiprotocol, dual channel communications controllers 416 and 418.

The system resource area is implemented as dual-port memory. As such, equal access to the system resource section is provided from either a local processor 401 or from the VME bus 420. The system resource functions appear as a bus slave to the VME bus. This provides the capability for these related functions to be controlled either from the SCM local processor, or from an optional processor connected to the system bus.

In the local processor section 401, the SCM digital circuitry includes coordinated digital coprocessors and interface and resource circuitry needed for specified performance, i.e., to provide control calculations and control data management needed for accurate and efficient control of all axes and to provide interfacing communication with a host controller, peripheral devices and other robot controllers. Preferably, a servo control manager 402 operates with a servo calculator 404 which functions as a slave processor principally to make position and velocity control loop calculations (i.e., feedback filters, loop gains, position and velocity errors, etc.).

The servo control manager 402 directs control, status and program data to and from the SCM board 400 and to and from the servo position/velocity control calculator 404. The servo control manager 402 can be a Motorola 68000 (or 68020) which has a high data processing capability. By separating data management and control calculation tasks in accordance with the respective capabilities of the processors 402 and 404, a basic circuit organization is provided as a basis for achieving substantially improved control performance with manufacturing and user economy.

In the illustrated embodiment, implementation of the local processor section of the SCM board 400 is based on usage of a 68000 processor as the servo control manager 402 and two coprocessors. Both coprocessors serve as peripheral devices to the 68000. One of the coprocessors 406 (preferably National Semiconductor 32081), provides floating-point calculation capability when arm solutions are to be provided by the SCM board 400. The other coprocessor, or slave processor, is the position/velocity servo calculator 404 and is implemented with a Texas Instruments TMS-32010 Digital Signal Processor. The position/velocity processor provides high speed fixed point calculation capability.

The remaining functions which are a part of the local processor section include local memory, both EPROM 422 and RAM 424, a peripheral timer/counter device, interrupt control 430, and system error monitoring devices 428. The local processor 402 can serve as a master to the VME bus for access to the TPM or other related type functions. However, the SCM board 400 does not provide VME bus system controller type functions which normally include system reset generation, bus arbitration for access to the bus and system bus clock generation, since these functions are implemented on the arm interface board 800.

The SCM board 400 is arranged to provide as much systems flexibility as is reasonably possible, and to obtain the maximum performance from available large scale integrated (LSI) circuitry. This is one of the reasons that the DMA and communications facilities are implemented in the system resource area as opposed to being directly connected to the local processor bus. This architecture not only frees the servo control manager 400 from direct intervention in communications data movement, it also eliminates the local processor bus communications related overhead, thus allowing high speed serial communications to be conducted without significant impact on program execution time in the servo control manager 400. Also, by placing these functions in the system resource area, these facilities can be operated by any other optional processor with capability of serving as a VME bus master. This would then totally free the servo control manager 400 from communications related processing This organization allows the complete functionality required for a robot control system to be implemented in a cost effective manner and on a minimal set of boards while also allowing increased performance controllers to be implemented without impacting the overall system design.

Another significant area is the interface between the servo control manager 402 and the servo calculator 404. Here, a special dual port memory organization, referred to as "ping-pong" or "bank switched" memory allows either processor to communicate with the other without impacting the processing performance of either processor.

PROGRAMMED OPERATION OF SERVO CONTROL BOARD

As schematically shown in FIG. 8C, the program system for the servo control data manager 402 comprises a background program 450 called MAIN and a cyclically operated foreground interrupt routine 452 called SERVO. When the system is stared as indicated to RESET, an initialization routine 453 is executed prior to continuous running of the MAIN program 450. In addition to the cyclically executed SERVO interrupt 452, an interrupt routine 454 called C&UNEX operates in the foreground on demand to process unscheduled or unexpected interrupts. Further, a special highest priority routine 457 called the watch dog timer interrupt functions in response to operate of the external watch dog hardware.

Where the robot control system includes the system control board 500 in FIG. 4 for higher performance through higher computing capacity, the MAIN 450 provides for receiving and distributing position commands from the system control board 500. In the minimum or basic robot control system configuration, the system control board 500 is not included in the MAIN program 450 further performs arm solutions to generate position commands locally on the servo control board 400. Additional description on the minimum robot control is presented subsequently herein.

The rate at which the MAIN program 450 is interrupted for the cyclical execution of the SERVO routine 452 is controlled by the signal VTICK generated once each millisecond on the VME bus 155 from the arm interface board 800. The basic functions provided by the SERVO routine 452 are:

(1) transfer control data to and from the servo calculator 404;
(2) transfer control data to and from the torque processor board 600;
(3) receive sensor feedback data over the VME bus 155 from the arm interface board 800;
(4) interface to the supporting background task RDMASC in FIG. 8E;
(5) perform synchronous data logging;
(6) perform one shot data logging;
(7) place broadcast data in a blackboard storage area;
(8) shut the system down if serious error conditions occur.

The initialization routine is shown in greater detail in FIG. 8D. The process 453 essentially comprises the performance of a series of tasks as indicated by the successive blocks. The following list provides further information on the nature of these tasks:

| TASK | INITIALIZATION |
| --- | --- |
| INISRC | bit-bus emulator for handshake |
| INSCROM | feedback interface |
| INIFIX | global variables |
| INCONF | robot default configuration |
| INTMS | servo calculator-download program store |
| INIAIB | torque processor board 600 |
| INROB | robot software configuration |

-continued

| TASK | INITIALIZATION |
|---|---|
| INJTMS | bank switch memory |
| INJONT | joint data structure via servo calculator program memory and torque processor board shared RAM reads |
| INBUF | internal buffer management areas |
| INIDLC | one shot and synchronous data logger interface |
| CRTINI | input/output hardware-servo control board 400 |
| BBINIT | bit-bus emulator interface and handshake with system control board 350 |

Figures 1, 8A:
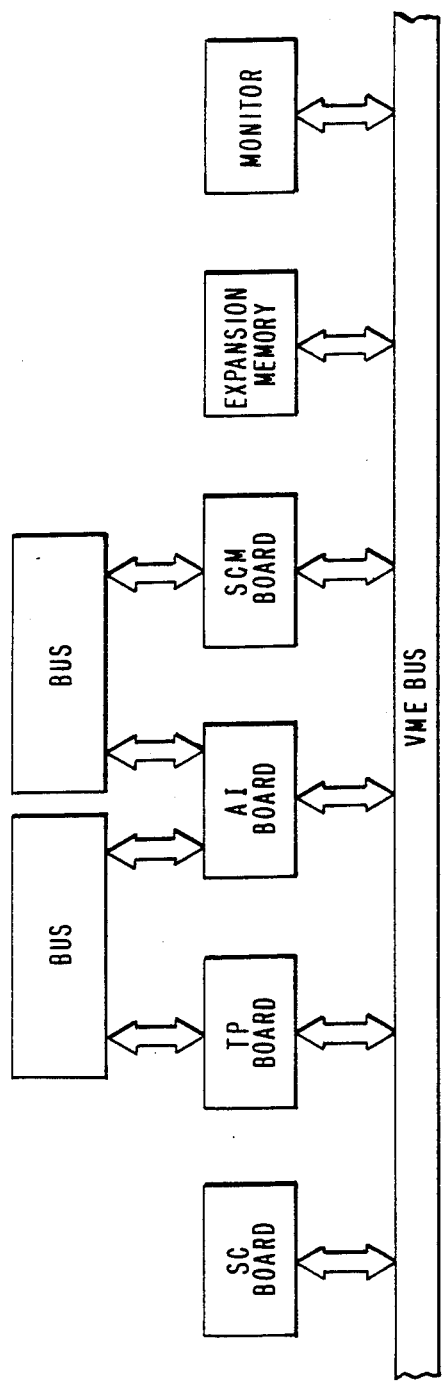
Figures 2, 8A:
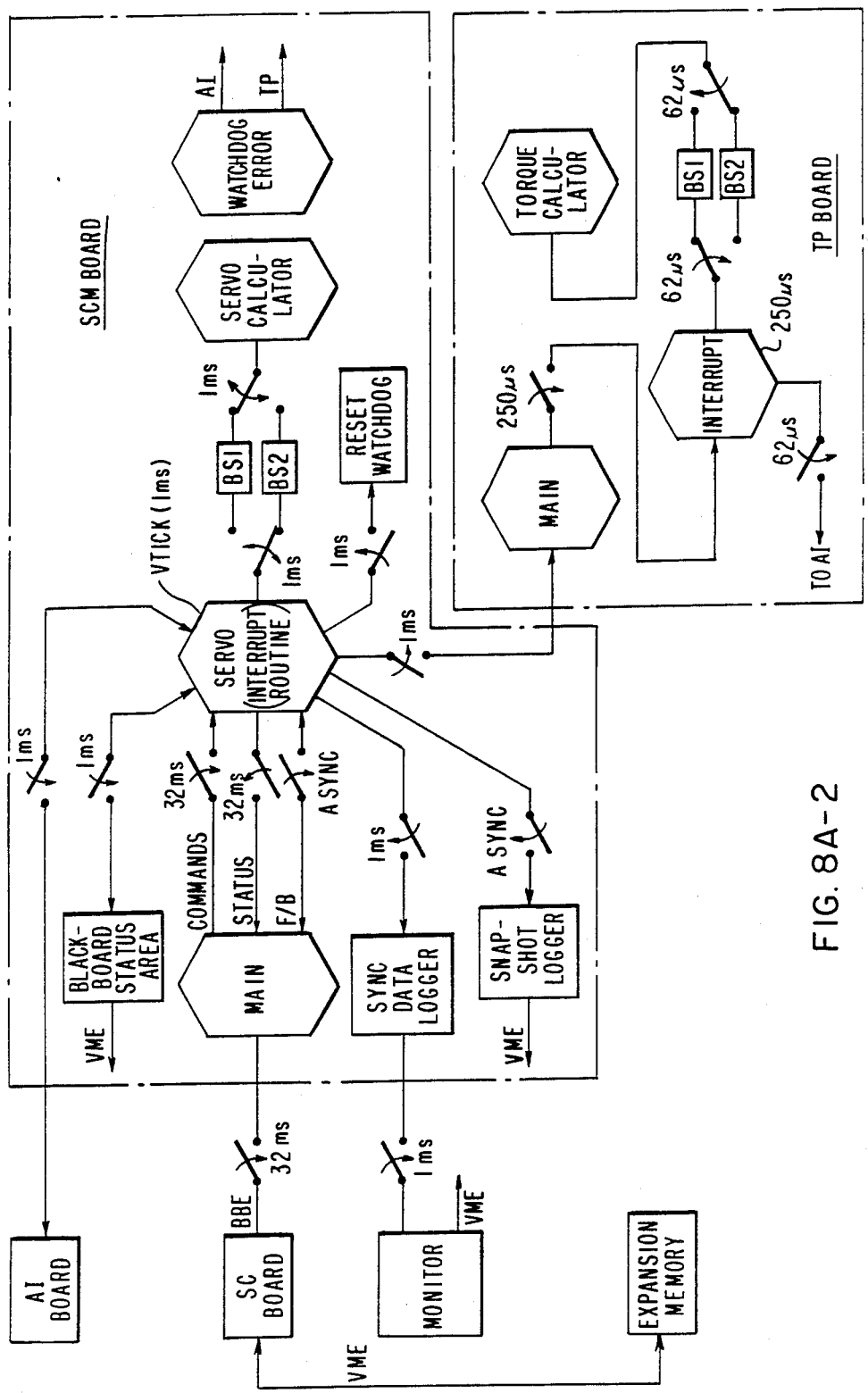

Once the system is initialized, the MAIN program 450 (FIG. 8E) begins continuous cyclical background execution. As shown in FIGS. 8F and 8G, a routine 456 called RDMASC is run to provide ongoing reading of system position commands from the bit-bus emulator which is designated memory area in shared RAM where system commands are deposited when received from the system control board 500.

Viewed as a whole, the background and interrupt routine can take on the following finite servo states:
0—Start-up state
1—Initializing state
2—Calibrating state
3—Servo disabled state
4—Servo enabled, hold state
5—Servo enabled, moving state The background task is responsible for assuring that valid state transitions occur, and for sequencing the interrupt task to new states. The interrupt task is therefore written to accept "commanded" states and to supply "current" states. In addition, the background task is sequenced via commands from the bit-bus emulator. The following state transition table defines this operation:

| Current State | Command ID from bit-bus |||||||||| 
|---|---|---|---|---|---|---|---|---|---|---|
| | 36 | 17 | 45 | 1 | 16 | 34 | 20 | 2 | 18 | 46 |
| 1 | −1 | −1 | −1 | −1 | −1 | 2 | −1 | −1 | −1 | −1 |
| 2 | −1 | 3 | −1 | −1 | −1 | 2 | −1 | −1 | −1 | −1 |
| 3 | 3 | 3 | 3 | 4 | −1 | −1 | −1 | 3 | −1 | 3 |
| 4 | 4 | −1 | −1 | 3 | −1 | −1 | 5 | 4 | 4 | 4 |
| 5 | −1 | −1 | −1 | 3 | 4 | −1 | 5 | −1 | −1 | −1 |

Where a "−1" indicates an illegal state transition. The bit-bus commands are defined as follows:
36—Where command
17—Calibrate command
45—Install servo parameters command
1—Enable/disable servos command
16—Hold command
34—Initialize command
20—Normal motion command
2—Break command
18—Limp command
46—Upload current servo parameters command Generally, a set of position commands is generated for the servo loops once each VALCYCLE in this case once every 32 milliseconds. In turn, each VALCYCLE is measured by Vticks which are generated on the VME bus once every millisecond. There are thirty-two (32) Vticks in each VALCYCLE in this case.

A cycle counter named TCKCNTR counts the Vticks in each VALCYCLE. A running counter called UNICNTR keeps a summing count on Vticks up to $2^{31}$ ticks.

When the next previous VALCYCLE has been ended as indicated by the UNICNTR in block 457, block 458 operates on the beginning of the new VALCYCLE when TCKCNTR=1 to initiate reception of the new set of position commands for the new VALCYCLE. Thus, block 459 reads the new commands from the bit-bus emulator.

If the command includes an emergency command (such as disable servo), block 460 directs the emergency command to an emergency command buffer. Block 461 sends motion (position) commands to a motion command buffer. Similarly, block 462 sends the non-motion commands to a non-motion command buffer.

The blocks 460, 461 and 462 perform like basic functions. First, the command is read from the bit-bus emulator in shared RAM. Next, prescribed checks are made to validate the command. Finally, the command is routed to the designated buffer in local non-shared internal RAM.

If no direction is found to transfer a system command to an internal RAM buffer, block 463 records a no command error and prepares an alternate command (same as last command or a shutdown if this is the second occurrence of this no command error).

Next, blocks 464 and 465 send a response to the system control board 350 that the newest command has been received when the value of the tick counter nears the end of the current VALCYCLE, i.e., when it equals the VALCYC minus three. Blocks 466 next repeatedly polls UNICNTR until RDMASC is to be re-executed to receive the next system command.

When a VTICK occurs (i.e., once every millisecond), RDMASC is temporarily interrupted for execution of the SERVO routine 452. As shown in the flowchart in FIG. 8B, the SERVO routine 462 first performs needed bookkeeping and overhead tasks as indicated in block 470. For example, the watchdog timer is reset for the 2 millisecond interrupt. If the tick is a long tick, i.e., the tick counter equals one to mark the start of a new VALCYCLE, block 471 performs certain additional overhead tasks. The basic functions performed are: reset tick counter to 1; route the new position command from the system control board to the servo calculator; and process changes of state in the SERVO routine.

LOADING DATA FOR SWITCHING TO THE SERVO CALCULATOR

If the tick is a short tick, i.e., an intermediate tick in the 32 tick cycle, or after long tick overhead has been performed, block 472 prepares for transferring data to the servo calculator by loading data to the bank switching memory according to the state in which the servo calculator is to be.

The flowchart in FIG. 8G shows the servo calculator setup in greater detail If block 473 finds the calculator is to be in the start-up state, block 474 fetches data needed for start-up logic for downloading to the servo calculator 404 in FIG. 6A-1. For the initialization state, blocks 475 and 476 fetch initialization command data for downloading to the servo calculator 404. Similarly, calibration command data is readied for the servo calculator 404 by blocks 477 and 478 for the calculator calibration state.

If the calculator is to be disabled, blocks 479 and 480 load into the bank switching memory a disabled command. Finally, if the calculator state is to be hold or moving, which covers most of the operating line, blocks 481 and 482 load motion command data into the bank switched memory. If none of the listed states are detected, block 483 records an error.

DATA FLOW AND TIMING

In the HOLD/MOTION state, control data generally flows as follows as seen in overview FIG. 8A-2. Once every VALCYCLE, i.e., once every 32 milliseconds in this case, position command data for all axes is received by the servo control board main program from the system control board and shuttled through the bank switch memory to the servo calculator. Feedback data (position and velocity) is generated for each axis every millisecond and it is transferred to the servo calculator through the bank switched memory every millisecond by the servo control data manager through operation of the servo interrupt routine.

The servo calculator computes a torque command every millisecond for each axis from the command and feedback data In turn, the torque commands are transferred by every millisecond by the servo control data manager from the bank switched memory to the torque processor board. On the TP board, torque calculations based on torque commands and current feedback are performed to generate motor voltage commands for all axes every 250 microseconds.

SWITCHING DATA TO THE SERVO CALCULATOR

After completion of the setup subroutine 472, block 484 performs whatever data transfer service is needed for the foreground/background interface within the servo control manager 402 of FIG. 6A-1.

"MAILBOX" INTERFACE FOR 68K FOREGROUND/BACKGROUND TASKS

In order to effectively use the interrupt routines in the 68000 microprocessor (68K) of servo control manager 402 it has become necessary to perform various asynchronous "setup" operations in the background task, while using the foreground task(s) to instantiate the changes. This approach allows the foreground tasks to have complete control of subordinate processors and devices. It also allows the less time critical setup to be spread out over several servo cycles. (In this discussion background refers to the non-interrupt task.)

A shared RAM mailbox interface was chosen to allow the background routine to communicate a list of tasks to be performed by the foreground routine. Each task request is encoded into a "packet" which contains the information required by the foreground task. The packet structure was designed to be simple yet as generic and efficient (in terms of decoding and execution costs) as possible. The following table describes the format of the interface:

| Offset (bytes) | | Contents |
|---|---|---|
| 0 | | Semaphore byte (1=Full, 4=Empty) |
| 1 | | Number of Packets (requests) |
| 2-3 | | → Command Field |
| 4-5 | first | Message size (number of 16-bit words) |
| 6-9 | packet | FROM Address Field |
| a-d | | →TO Address Field |
| e-15 | | Second packet (items 2-d from above) |
| 16-1d | | Third packet |

For the servo interrupt routine the elements in each packet are interpreted as follows (descriptions assume a single packet is presented):

Command Field (CF):

CF>0: TMS 320 servo command
  *Load CF into the TMS command list (see "TMS Ping-Pong Memory Map")
  *copy "message size" words from "FROM" and append to the TMS input buffer.
  *set semaphore byte to "empty"

CF=0: Transfer data command
  *copy "message size" words from "FROM" to "TO"
  *set semaphore byte to "empty"

CF=−9999: TMS reset command (allows direct writes to TMS program memory)
  *disable (level 5—VTICK) interrupts
  *put TMS into reset state
  *copy "message size" words from "FROM" and "TO"
  *remove reset state from TMS
  *set stick to bank 0
  *enable (level 5—VTICK) interrupts
  *set semaphore byte to "empty"

CF<0: Multipass TMS 320 servo command
  *set CF=−CF
  *Load CF into the TMS command list
  *copy "message size" words from "FROM" and append to the TMS input buffer.
  *DO NOT set semaphore byte to "empty".

Notes:
  *In order to avoid time consuming packet management for multipass commands, ALL packets will be re-processed on the second pass if ANY packet is of type Multipass.
  *Because resetting the TMS results in automatically switching to bank 0 (which may not be the bank earlier packets were stored in), the TMS bank memory is NOT switched if a TMS reset command is present. Therefore these commands should be sent separately.
  *Currently 300 (hex bytes of system resource RAM is set aside for the mailbox area and for free space to store the data. The following list of suggested global symbol names further defines the area.

| List of Global Symbols | | |
|---|---|---|
| FB_SHR | 0x34900 | /* shared ram base address to start of /* foreground/background semaphore area */ |
| FB_SEM | 0x0000 + FB_SHR | /* ptr to FB semaphore byte */ |
| FB_NOP | 0x0001 + FB_SHR | /* ptr to number of packets (byte) */ |
| FB_CF1 | 0x0002 + FB_SHR | /* ptr to the first command field */ |

-continued

List of Global Symbols

| | | |
|---|---|---|
| F_MAX | 0x0004 | /* maximum number of packets allowed */ |
| FB_DAT | 0x0032 + FB_SHR | /* ptr to area of free space to store data to |
| | | /* be transferred to foreground task */ |
| FB_MXD | 0x02ce | /* maximum size of FB_DAT in bytes */ |
| FB_EMPTY | 0x04 | 173 /* no command list */ |
| FB_FULL | 0x01 | /* command list present */ |

Figure 8B:
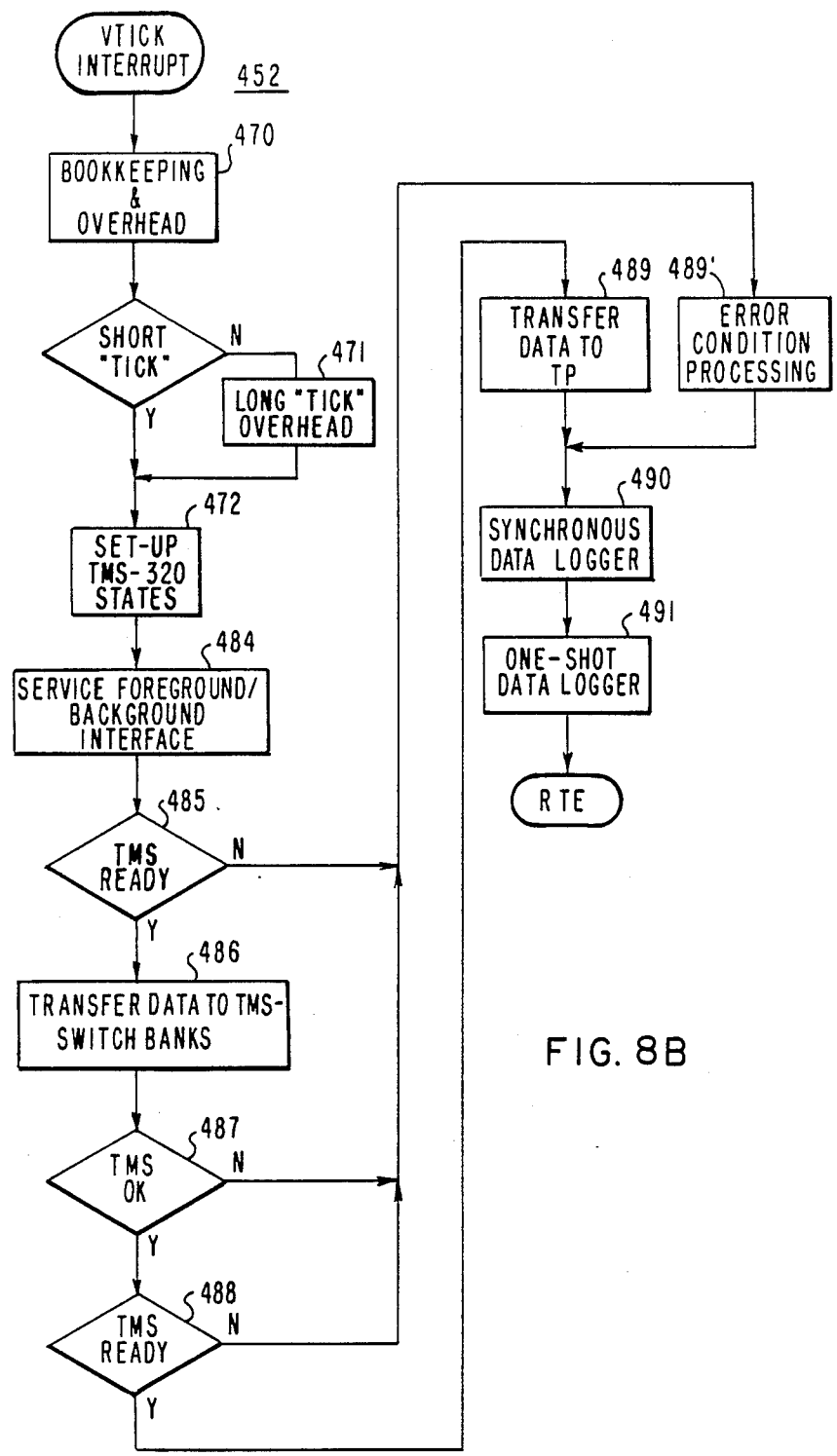
Figure 8F:
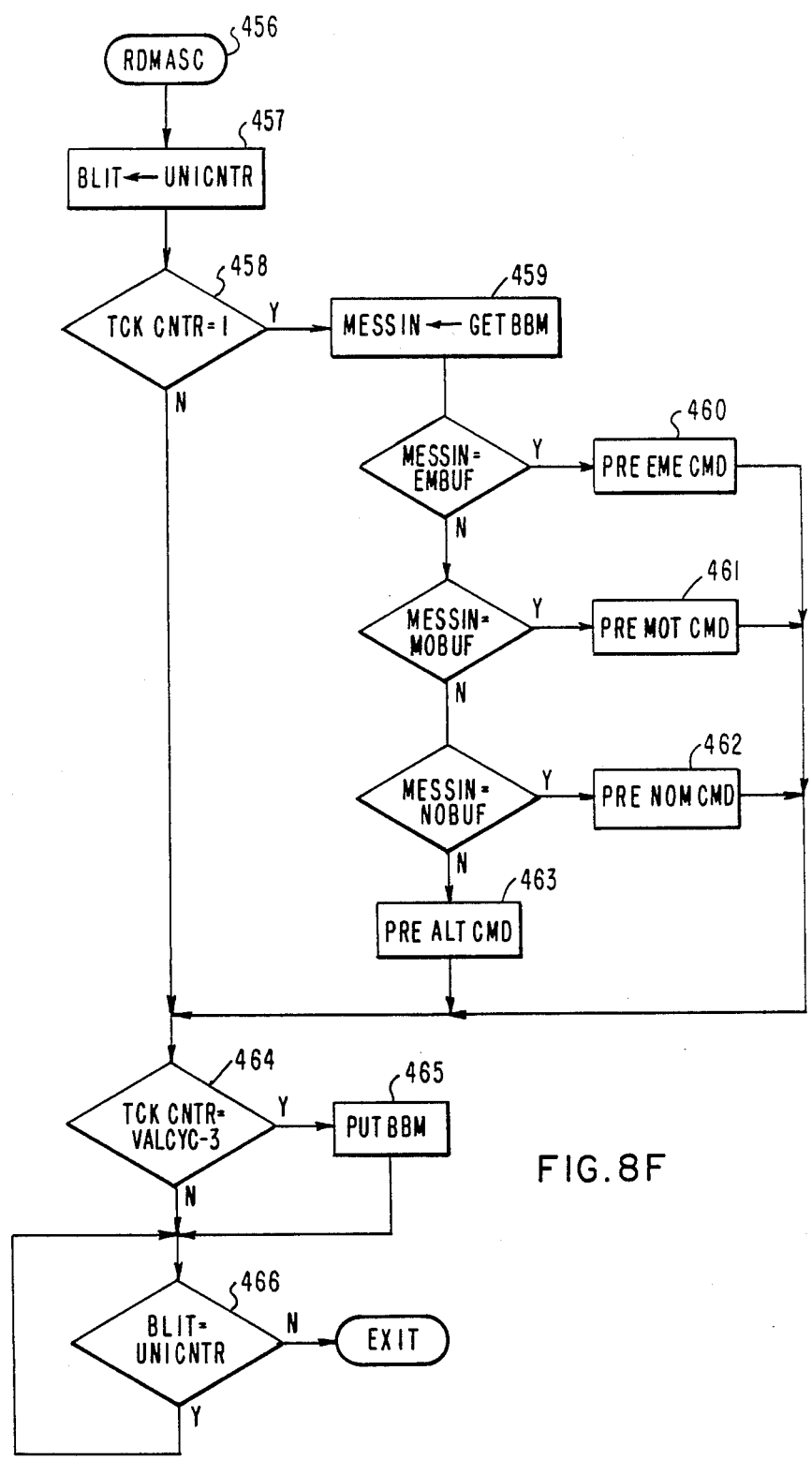
Figure 8G:
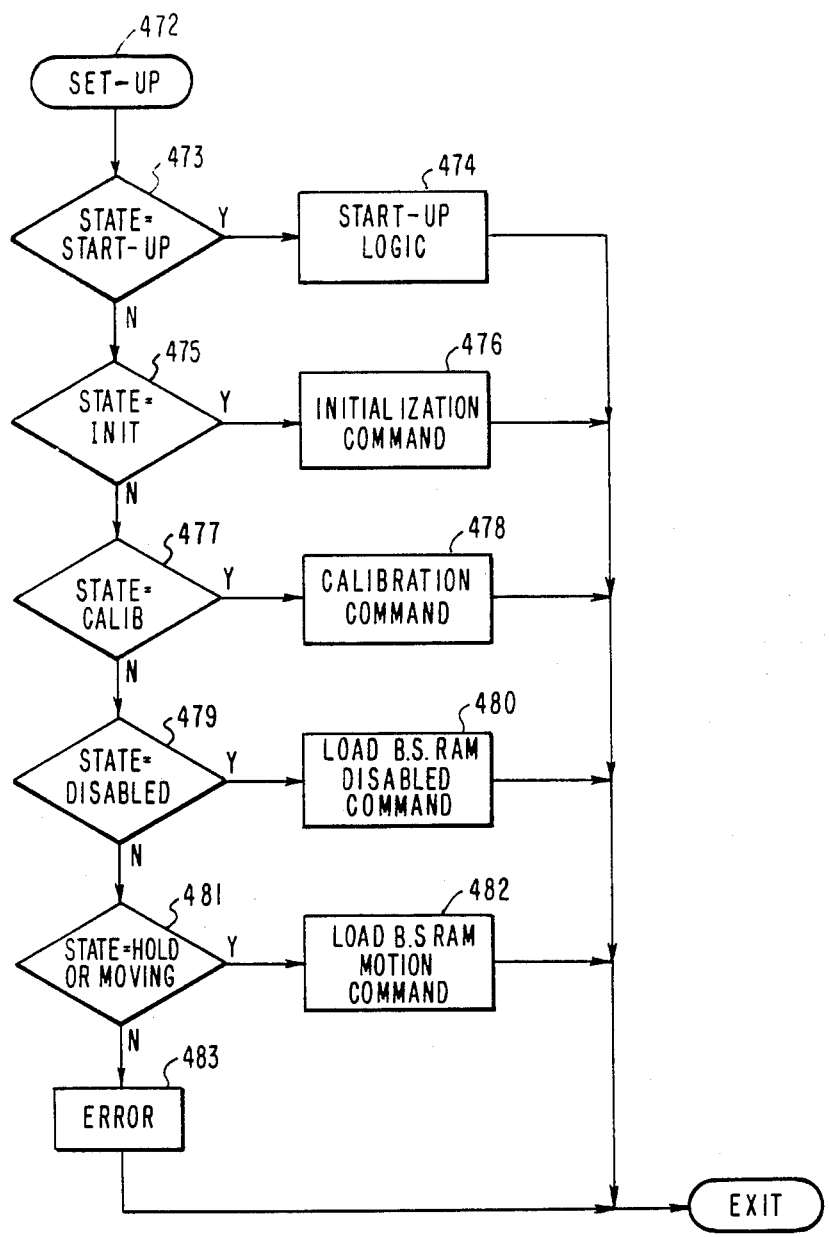

If block 485 in FIG. 8B detects that the TMS servo calculator 404 of FIG. 6A-1 is ready, block 486 transfers the previously prepared position command and/or other data to the calculator 404 through the ping-pong memory 434. If the block 485 or block 487 finds that the servo calculator 404 is in a defective state, an error shutdown is commanded. The following command list provides greater detail on the data transferred to the TMS servo calculator.

Ping-Pong Memory Map

| Addresses | | | |
|---|---|---|---|
| 68k | TMS | Symbol | Contents |
| 3c000-3c007 | 0-7 | TMSCOM | TMS Command List |
| 3c010-3c09f | 8-4f | TMSIN | TMS Input Buffer |
| 3c0a0-3c0ff | 50-7f | TMSSTA | TMS Status Buffer |
| 3c100-3c11f | 80-8f | TMSTOR | TMS Torque Output Buffer |
| 3c120-3c21f | 90-10f | TMSLOG | TMS Logged Data Buffer |
| 3c220-3c7ff | 110-3ff | TMSGC | TMS General Communication Area |

Each of the buffers which comprise the 1k word ping-pong memory is described in detail below. The symbols shown in the table are simply suggested names to use for the start of each buffer to promote consistency between the 68 k and TMS code. The buffers are organized such that the first two areas (TMSCOM and TMSIN) are read-only for the TMS (write-only for the 68 k). The next three areas are write-only for the TMS and vise versa for the 68 k. Whereas the final area (TMSGC) is a read/write area for both processors.

The TMS command list is simply a NULL command terminated list of task requests for the TMS to perform in a given cycle. Up to seven (7) commands can be included in a list. Each element is a 16-bit command used to direct the actions of the TMS. The preferred commands are as follows:

| Command | Action |
|---|---|
| 1 | Not currently used |
| 2 | Not currently used |
| 3 | Not currently used |
| 4 | Not currently used |
| 5 | Not currently used |
| 6 | Calibrate initial position and velocity |
| 7 | Calculate torque (execute servo with no cycle update) |
| 8 | Calculate torque (execute servo with cycle update) |
| 9 | Not currently used |
| a | Identify TMS servo parameters and version ID |

The TMS input buffer contains additional input data required by the TMS conditioned on the value of the command word and its relative location in the command list. Input data required by each command is stored sequentially in the same order as the commands in the command list. Currently this buffer has the following format if the command word=8 (e.g., a cycle or "long" tick); note that the organization of this table is by 16-bit "short" word count.

TMSIN if absolute encoders and tachometers are used (e.g. 860/rx)

| Word | Contents |
|---|---|
| 0 | Time stamp |
| 1 | Servo enable mask |
| 2 | Velocity scale factor |
| 3 | High word of position command for joint 1 |
| 4 | Low word of position command for joint 1 |
| 5 | Absolute encoder measurement for joint 1 |
| 6 | Absolute velocity measurement for joint 1 |
| 7-10 | Words 3-6 for joint 2 |
| 11-14 | Words 3-6 for joint 3 |
| 15-18 | Words 3-6 for joint 4 |
| 19-22 | Words 3-6 for joint 5 |
| 23-26 | Words 3-6 for joint 6 |

If the command word=7 (e.g., a non-cycle or "short" tick) the TMS input buffer assumes the following form:

| Word | Contents |
|---|---|
| 0 | Time stamp |
| 1 | Servo enable mask |
| 2 | Absolute encoder measurement for joint 1 |
| 3 | Absolute velocity measurement for joint 1 |
| 4-5 | Words 2-3 for joint 2 |
| 6-7 | Words 2-3 for joint 3 |
| 8-9 | Words 2-3 for joint 4 |
| 10-11 | Words 2-3 for joint 5 |
| 12-13 | Words 2-3 for joint 6 |

TMSIN for command=8 if ONLY incremental encoders are used (e.g., Puma line)

| Word | Contents |
|---|---|
| 0 | Time stamp |
| 1 | Index interrupt/servo enable mask |
| 2 | Carry (wrap) for position feedback |
| 3 | Velocity scale factor (1608 format) |
| 4 | High word of position command for joint 1 (in 3208 form) |
| 5 | Low word of position command for joint 1 |
| 6 | Encoder count/index for joint 1 |
| 7-9 | Words 4-6 for joint 2 |
| 10-12 | Words 4-6 for joint 3 |
| 13-15 | Words 4-6 for joint 4 |
| 16-18 | Words 4-6 for joint 5 |

-continued

| Word | Contents |
|---|---|
| 19-21 | Words 4-6 for joint 6 |

If the command word=7 (e.g., a non-cycle or "short" tick) the TMS input buffer assumes the following form when using incremental encoders:

| Word | Contents |
|---|---|
| 0 | Time stamp |
| 1 | Index interrupt/servo enable mask |
| 2 | Encoder count/index for joint 1 |
| 3 | Encoder count/index for joint 2 |
| 4 | Encoder count/index for joint 3 |
| 5 | Encoder count/index for joint 4 |
| 6 | Encoder count/index for joint 5 |
| 7 | Encoder count/index for joint 6 |

TMSIN for command=8 if absolute resolvers are used (e.g., 100 robot)

| Word | Contents |
|---|---|
| 0 | Time stamp |
| 1 | Servo enable mask |
| 2 | Velocity scale factor |
| 3 | High word of position command for joint 1 |
| 4 | Low word of position command for joint 2 |
| 5 | Absolute resolver measurement for joint 1 |
| 6-8 | Words 3-5 for joint 2 |
| 9-11 | Words 3-5 for joint 3 |
| 12-14 | Words 3-5 for joint 4 |
| 15-17 | Words 3-5 for joint 5 |
| 18-20 | Words 3-5 for joint 6 |

If the command word=7 (e.g., a non-cycle or "short" tick the TMS input buffer assumes the following form:

| Word | Contents |
|---|---|
| 0 | Time stamp |
| 1 | Servo enable mask |
| 2 | Absolute resolver measurement for joint 1 |
| 3 | Absolute resolver measurement for joint 2 |
| 4 | Absolute resolver measurement for joint 3 |
| 5 | Absolute resolver measurement for joint 4 |
| 6 | Absolute resolver measurement for joint 5 |
| 7 | Absolute resolver measurement for joint 6 |

If the command word=6 (e.g., a calibration command) the TMS input buffer is:

| Word | Contents |
|---|---|
| 0 | Time stamp |
| 1 | Absolute position in encoder bits (3208) for joint 1 |
| 2 | Absolute position in encoder bits (3208) for joint 2 |
| 3 | Absolute position in encoder bits (3208) for joint 3 |
| 4 | Absolute position in encoder bits (3208) for joint 4 |
| 5 | Absolute position in encoder bits (3208) for joint 5 |
| 6 | Absolute position in encoder bits (3208) for joint 6 |

If the command word=A (e.g., ID command), no inputs are required in the TMS input buffer.

The purpose of the TMS status buffer is to provide an area where any process can look to find out the current position/velocity of the arm. As such this buffer is ordered as follows:

| Word | Contents |
|---|---|
| 0 | Time stamp (future) |
| 1 | Enable/disable bit mask |
| 2 | Limp status bit mask |
| 3 | Brake status bit mask |
| 4 | PFB, Position of joint 1 in encoder bits in 3208 form (high word) |
| 5 | PFB, Position of joint 1 in encoder bits (low word) |
| 6 | VFINO, Velocity of joint 1 in encoder bits/servo-tick in 1608 form |
| 7-9 | 4-6 for joint 2 |
| 10-12 | 4-6 for joint 3 |
| 13-15 | 4-6 for joint 4 |
| 16-18 | 4-6 for joint 5 |
| 19-21 | 4-6 for joint 6 |
| 22 | Status (error/no error/command error) |
| 23 | Servo coincidence word (fine/course) |
| 24-25 | Error status (hi and low) |
| 26 | Input task bit mask (hi byte)/completion status bit mask (low byte) |

The torque output buffer contains the torques to be applied over the next servo tick. The torques are formatted such that the 68k can simply copy them directly to the appropriate device (DAC/TP board) without modification. This buffer is simply organized as:

| Word | Contents |
|---|---|
| 0 | Torque output for joint 1 |
| 1 | Torque output for joint 2 |
| 2 | Torque output for joint 3 |
| 3 | Torque output for joint 4 |
| 4 | Torque output for joint 5 |
| 5 | Torque output for joint 6 |

The logged data buffer currently is composed of the following items all recorded at the servo sample rate:

| Word | Contents |
|---|---|
| 0 | Joint 1 PCT, Position command in 3208 form (high word) |
| 1 | Joint 1 PCT, Position command (low word) (bits) |
| 2 | Joint 1 VCT, Velocity command in 1608 form (B/tick) |
| 3 | Joint 1 VFBF Filtered velocity feedback in 1608 form (B/tick) |
| 4 | Joint 1 Position error in 1605 form (bits) |
| 5 | Joint 1 Integration error in 32016 form (high word) |
| 6 | Joint 1 Integration error (low word) |
| 7 | Joint 1 Velocity error in 1608 form (B/tick) |
| 8 | Joint 1 DVHATC Accel command in 1608 (B/tick/tick) |
| 9 | Joint 1 SUM, Intermediate signal sum in 1600 form |
| 10-18 | 0-8 for joint 2 |
| 19-27 | 0-8 for joint 3 |
| 28-36 | 0-8 for joint 4 |
| 37-45 | 0-8 for joint 5 |
| 46-54 | 0-8 for joint 6 |

The General Communication are is used as a general read/write area for passing information to and from the servo calculator.

Next, block 488 of FIG. 8B determines whether the torque processor board 600 of FIG. 8B is ready for data transfer and if not an error shutdown is commanded. Normally, however, the TP board 600 would be ready and block 489 transfers torque command and/or other data to the TP board 600. Other data may include servo gains and correct gains for the particular robot being controlled, all of which would be downloaded during step-up time. Blocks 490 and 491 then perform synchronous and one-shot data logging routines. The one-shot data logger 491 is flagged for operation by various routines when an error occurs.

SCM Data Logger Mechanisms

Figure 8H:
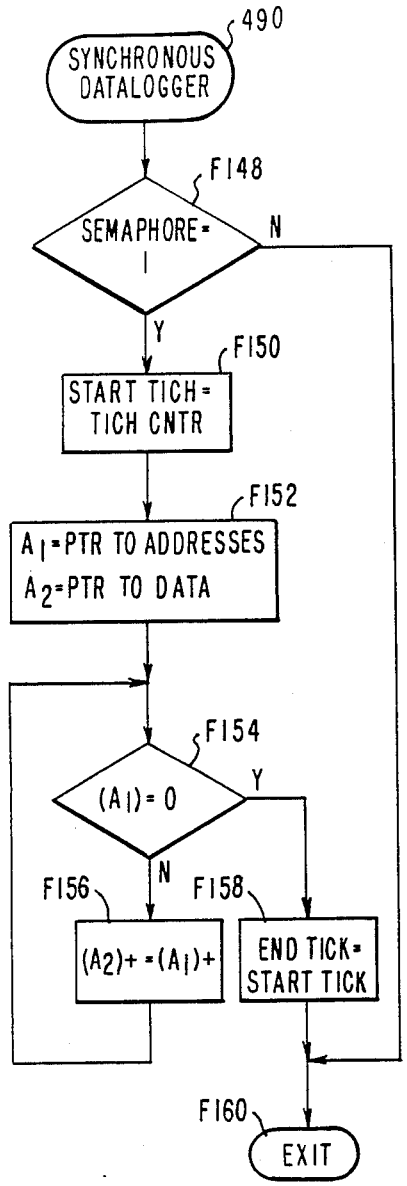
Figure 8I:
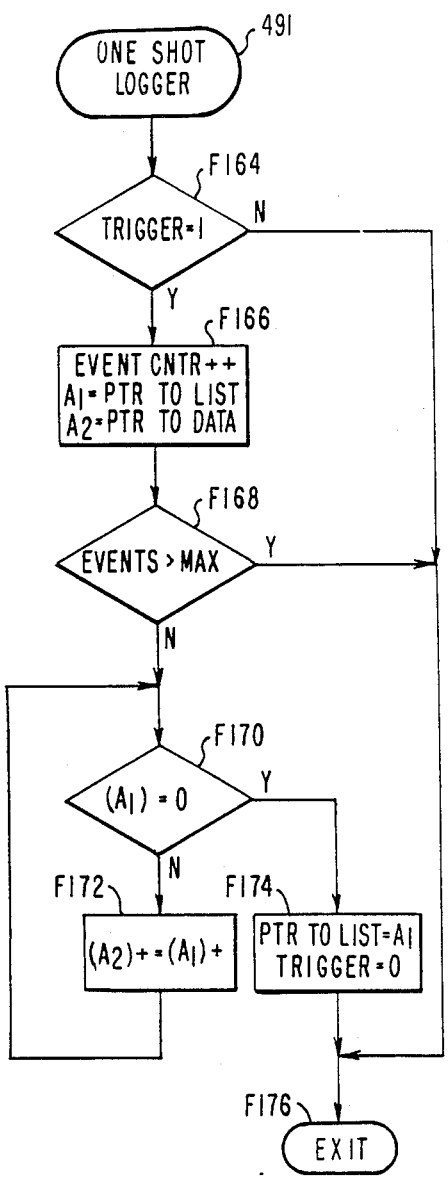

Both data loggers 490 and 491 shown in FIGS. 8H and 8I, respectively, are controlled by a shared RAM "mailbox" interface. In addition, both are invoked in the servo interrupt routine immediately following the execution of the servo code. Therefore, the fastest rate at which data can be logged is dictated by the servo update rate employed (currently this is 1 ms). In the case of the one-shot data logger, it can also be invoked via a subroutine call (jsr logone). This is provided so that conditions present during unexpected errors can be recorded immediately (for example, prior to an emergency shutdown).

The shared RAM interface for the synchronous data logger is organized as follows (where all addresses are specified as offsets from the base address):

| Offset | Size   | Contents                                              |
|--------|--------|-------------------------------------------------------|
| 0      | 8 bits | Semaphore (1 = > log data)                            |
| 1-3    | 24 bits| Not used                                              |
| 4-5    | 16 bits| Starting tick counter                                 |
| 6-7    | 16 bits| Not used                                              |
| 8-9    | 16 bits| Ending tick counter                                   |
| a-b    | 16 bits| Not used                                              |
| c-f    | 32 bits| Pointer to list of addresses to log (32 bit data transfers) |
| 10-13  | 32 bits| Pointer to area in memory for SCM to deposit logged data |

Note: The areas which are not used in the above map will be eliminated in the future. They exist only because the original interface exclusively used long word quantities.

The shared RAM interface for the asynchronous one-shot data logger is organized as follows (where all addresses are specified as offsets from a base address):

| Offset | Size   | Contents                              |
|--------|--------|---------------------------------------|
| 0      | 8 bits | One-shot trigger (1 = log, reset to 0) |
| 1      | 8 bits | Not used                              |
| 2-3    | 16 bits| Total event counter                   |

In the servo calculator, two basic functions are performed. First, downloaded position command data is interpolated for each of the 31 ticks between long ticks in the VALCYCLE, and velocity and acceleration command data are computed from the position command data for each tick. Next, servo calculations are made for each axis after each tick for the position, velocity and acceleration commands then applicable and the concurrently received position and velocity feedback. As a result, a torque command is computed for each axis after every tick for execution by the torque processor board.

The control algorithms executed by the servo calculator are described in greater detail in Ser. No. 932,990.

For more detail on the SCM board 400, reference is made to Ser. No. 932,990

The planning trajectory (motion) software can be implemented on the SCM board 400 in a basic robot control or on the system control board 500 in an expanded robot control shown in FIG. 4.

MOTION SOFTWARE AT THE SYSTEM LEVEL

Robot position commands are generated by motion software at the system level. In the basic robot control, system motion software is resident on the SCM board 400.

Figure 8J:
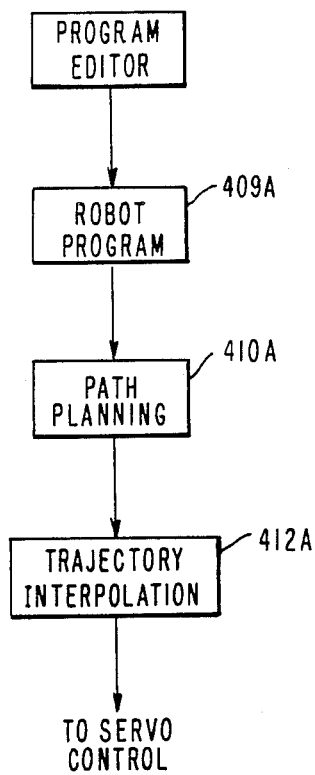

As shown in FIG. 8J, the motion system software includes a path planning program 410A and a trajectory interpolation program 409A. A robot program 414A prepared by the user, in this case preferably with use of the present assignee manufacturer's programming language called VAL II, specifies the robot destination points along its programmed path as well as certain other requests and specifications regarding robot operation. In effect, the planning and trajectory programs operate at the system level to process robot program outputs so as to enable robot controller execution of the robot program.

Thus, where a complicated path has been programmed, the robot program normally includes additional intermediate path points. Additionally, the robot program specifies tool tip speed, acceleration and deceleration as a percentage of maximum, and the type of path control, i.e., continuous or point-to-point.

The planning and trajectory programs can be installed on internal UNIVAL TM robot board memory, preferably EPROM, or it may be loaded when placed in use into general board memory from floppy disk or other storage means. The user robot program is loaded into UNIVAL TM robot board memory at the time of use.

In the case of the basic UNIVAL TM robot control, motion system software is resident on the SCM board 400. In expanded versions of the UNIVAL TM robot control, the system motion software is resident on the system control board. Of course, other variations are possible.

The planning program 410A runs on a demand basis, i.e., when a new destination point is received from the robot program. The trajectory interpolation program 412A runs cyclically at the system cycle rate, i.e., at the rate of once each 32 or 16 or 8 milliseconds in the preferred embodiment depending on the configuration of the UNIVAL TM robot control system as explained elsewhere herein or in the reference patent applications.

1. PLANNING PROGRAM

Basically, planning is performed by the robot control to define how the robot tool tip is to move from its present position to its commanded destination. Thus, the planning program generates a time profile for acceleration, slew and deceleration for successive segments of motion defined by the robot program.

Figure 8K:
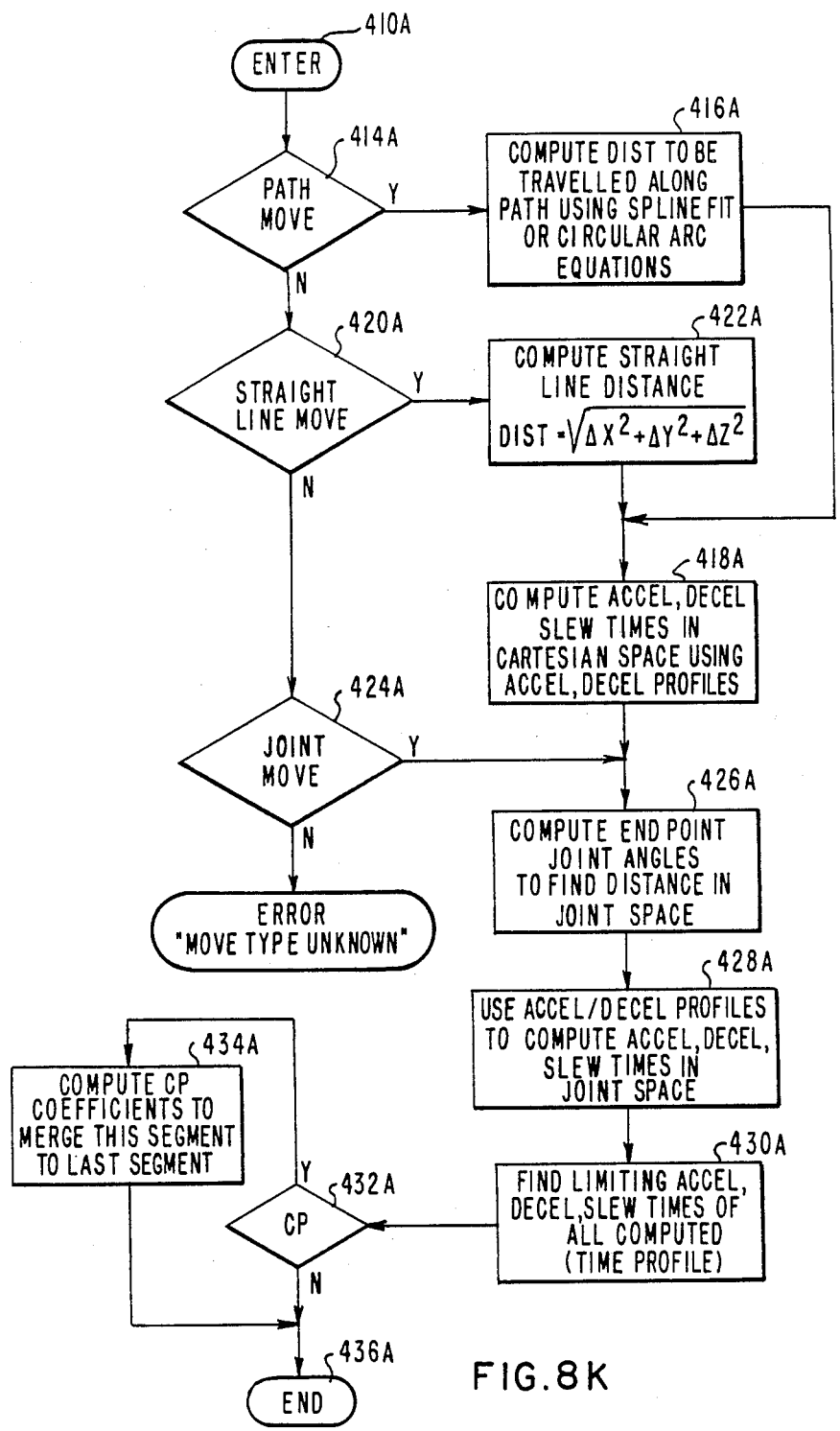

As shown in FIG. 8K, the planning program 410A determines the type of move to be made for each segment and then computes the segment time profile in accordance with the type of move Thus, block 414A determines whether a prescribed path move has been specified. If so, box 416A computes the distance to be traveled along the path using spine fit equations (up to third order polynomials in the present embodiment) and/or circular arc equations. Block 418A then computes the acceleration, slew deceleration times in Cartesian space making use of selected acceleration and deceleration profiles (squarewave, sinusoidal wave or table of values profiles in the present embodiment).

Reference is made to Ser. No. 932,840 for more disclosure on the planning feature that employs spline path fitting. Reference is made to Ser. No. 932,986 for more disclosure on the planning feature that employs acceleration/deceleration profile selection.

If a prescribed path move has not been directed, block 420A detects whether a straight line move is to be executed. In a straight line move, the tip of the tool moves along a straight line in Cartesian space and thus moves across the shortest distance between its present location and the destination location. A straight line move may not be the fastest move between two points since a joint move may be faster. The nature of the user application determines whether and when straight line moves are needed As in the case of a prescribed path move, the distance to be traveled in Cartesian space is computed when a straight line move has been directed. Thus, block 422A computes the straight line distance with use of the indicated formula.

A joint move is employed when the user wants the tool tip to be moved from one point to another in the shortest time. However, joint moves are avoided obstacles exist in the field of possible motion. In a joint move, all of the joints are moved in coordination to produce the shortest tool tip move regardless of the path of the tool tip.

Box 424A determines whether a joint move is to be executed. If so, block 426A computes the endpoint joint angles for all axes for the joint move. Next, the joint distance is computed in joint space by taking the difference between the destination and present joint angles for each axis. The joint move for each joint is accordingly established.

Similarly, block 426A computes the joint moves in joint space for prescribed path and straight line moves. Block 428A then computes the acceleration, slew and deceleration times in joint space from the joint distances using the selected acceleration/deceleration profiles, i.e., the time profile for each joint motion is basically determined.

Box 430A next determines what limits apply to acceleration, slew and deceleration times to modify the time profiles in accordance with limits if necessary. The slowest limit time for any particular joint is set as a limit time for all of the joints, i.e., for the move as a whole. The acceleration/deceleration (torque) and velocity capabilities of the robot being controlled are used in setting time limits.

For disclosure on a feature of the UNIVAL TM robot control in which the time for a move is specified by the user (i.e., programmed time move), reference is made to Ser. No. 932,988. The manner in which programmed time moves are integrated into determining the joint time profiles (block 430A).

If box 432A determines that continuous path operation has been directed by the user, box 434A computes the continuous path coefficients to be used for smooth merging of the present motion segment with the upcoming motion segment. In smoothing the transition between the slews of successive motion segments, box 434A essentially eliminates unnecessary deceleration/acceleration in changing from one velocity to another. Reference is made to Ser. No. 932,985 for more disclosure on the operation of the continuous path feature of the UNIVAL TM robot control.

Once continuous path smoothing calculations have been completed or if continuous path smoothing has not been required, block 436A ends execution of the planning program.

2. TRAJECTORY PROGRAM

Figures 1, 8L:
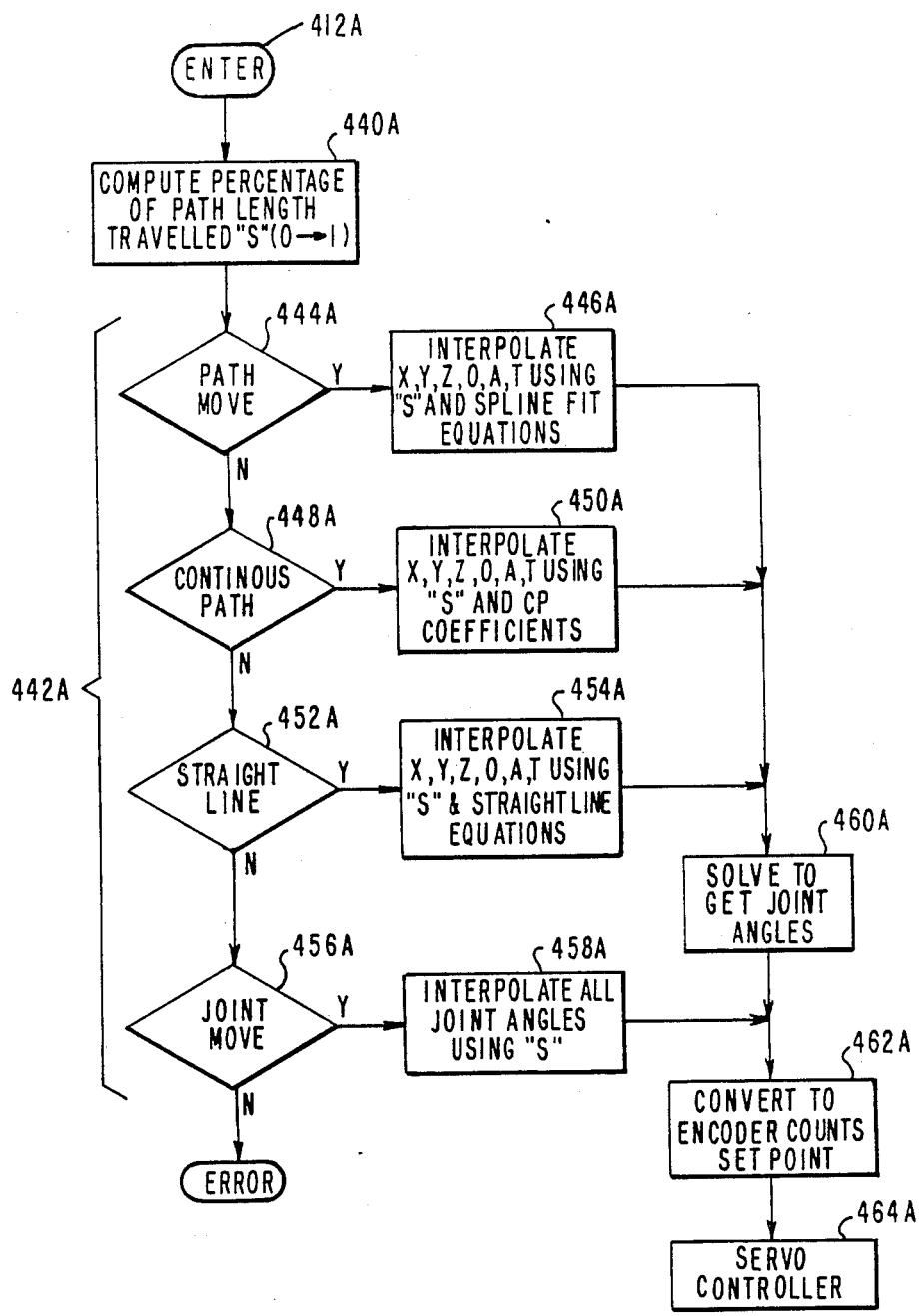
Figures 2, 8L:
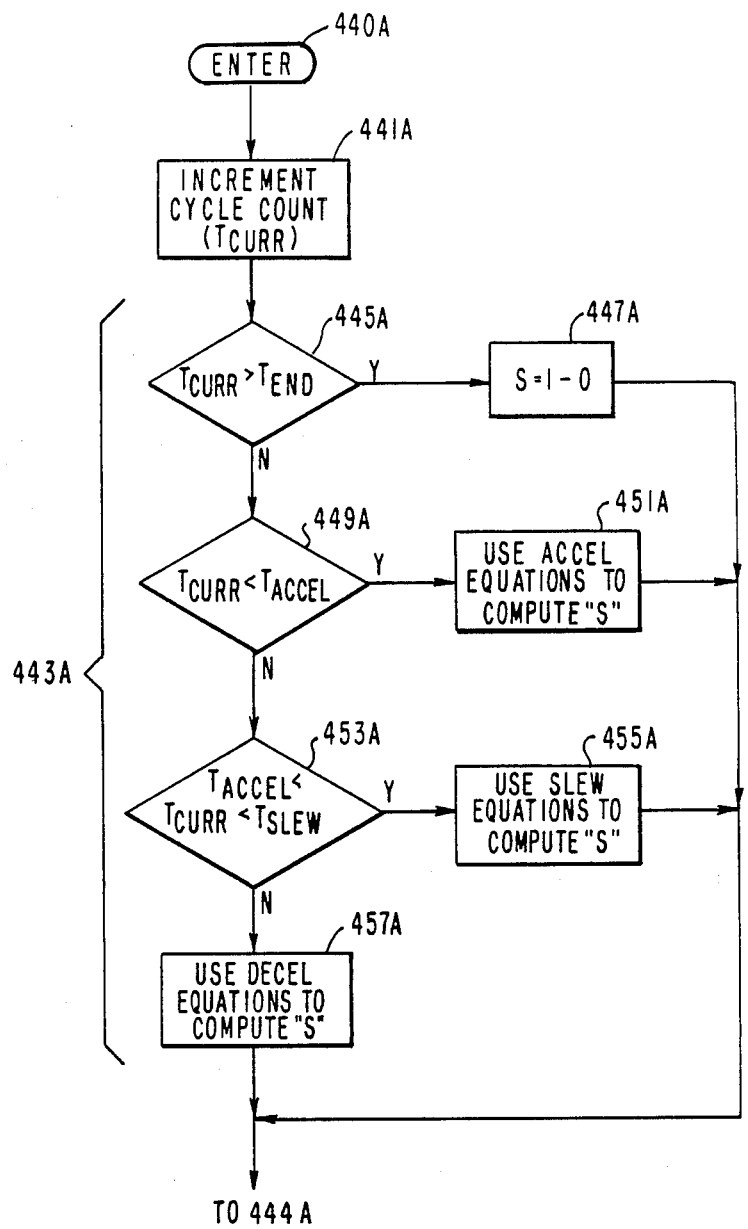

The trajectory program 412A shown in FIG. 8L-1 is executed during each system cycle to generate joint position commands for the next system cycle. Generally, the trajectory program 412A computes for each upcoming system cycle the accumulated distance to be traveled for each joint when the upcoming cycle is completed. A factor referring to as "S" is computed in the distance calculation. Thus, S is the accumulated distance (S) as a percentage of the total distance to be traveled in terms of a normalized path length (0–1).

A new set of interpolated endpoints are generated to provide position commands for the robot axes for execution during the upcoming system cycle, i.e., the total user specified segment move is subdivided into cycle moves to be executed in successive system cycles (which may in this case have a length of 32, or 16 or 8 milliseconds).

The new position commands are based on the S calculation and the type of move being performed. In implementing the position commands, the servo control provides further real time interpolation by dividing each system cycle into millisecond intervals during which moves of equal distance are executed for each joint.

As shown in the flow chart of FIG 8L1, block 440A first makes the distance computation for the upcoming system cycle, i.e., S is calculated. In boxes 442A, the type of move is determined and the interpolation calculations for that type move are executed.

Specifically, block 444A determines whether a prescribed path move has been directed, and if so box 446A calculates the Cartesian X, Y, Z, O, A, and T interpolations using the S distance factor, spline fit equations (up to 3rd order polynomials) and circular arc equations. The O, A, and T (or X, Y, Z, n, o, and a coordinates represent the orientation of the tool tip in angles.

Generally, in making interpolation calculations for the various types of path moves, the S factor operates as a percentage multiplier in computing for each axis the fraction of the total commanded move to be completed in the upcoming system cycle.

Box 448A determines whether a continuous path move has been directed, and if so box 450A calculates the X, Y, Z, O, A, and T interpolations using the S distance factor and stored continuous path coefficients. The latter are employed in equations that are used to produce smooth transitioning between different slew values in successive path segments.

In block 452A, a determination is made as to whether a straight line move has been directed. If so, box 454A makes the interpolation calculations for X, Y, Z, O, A and T using the S distance factor and straight line equations.

If a joint move is detected in box 456A, block 458A makes interpolation calculations for all of the joint angles using the S distance factor. Box 460A converts Cartesian interpolations to joint angles for the case of a prescribed path move, a continuous path move or a straight line move. The conversion to joint angles represents the arm solution and involves knowledge of kinematics of the robot arm, specifically the lengths of the various links and the angles between axes of rotation.

Finally, block 462A converts the interpolated joint angle commands to respective encoder counts operable as a set of position commands applied to the various robot axes by the servo controller 464A. The encoder count conversion reflects the resolution of the encoders, gear ratios and any mechanical coupling between joints (usually only wrist joints are coupled).

The S calculation is showing greater detail in the flow chart in FIG. 8L2. Block 441A first increments the system cycle counter. Blocks 445A then the current cycle count to the time profile computed in the planning program for the current path segment. In this manner, the segment portion (acceleration, slew, deceleration) in which the tool tip is currently located is determined. The applicable acceleration, slew or deceleration value is accordingly identified for the S computation.

If box 445A detects that the cycle count exceeds the segment time, S is set equal to 1 by block 447A. If the acceleration segment portion is detected by box 449A, block 451A uses acceleration equations to compute S. Similarly, if block 453A detects the slew segment portion, box 455A uses slew equations to compute S.

Block 457A employs deceleration equations to compute S if the acceleration, slew and segment terminated blocks 445A, 449A, and 453A are negated. The S calculation routine is then completed and trajectory program execution returns to block 444A.

The following equations are employed in making the S calculation:

Acceleration Equations $$\text{square wave } s = t^2/(t_a * (2 * t_s + t_a + t_d)$$

$$\text{sinusoidal profile } s = \frac{t_a * [(t/t_a) - (\sin(180 * (t_a/t)))/pi]}{[t_a + 2 * t_s + t_d]}$$

Deceleration Equations square wave $$s = ((2 * t_s + t_a + t_d) - ((tt - t)**2/t_d))/(2 * t_s + t_a + t_d)$$

$$\text{sinusoidal profile } s = \frac{t + t_s + (t_d/pi) * [\sin(180 * y/t_d)]}{(t_a + 2 * t_s + t_d)}$$

$$\text{where: } y = (t - tt + t_d)$$

Slew Equation $$s = (2 * t - t_a)/(2 * t_s + t_a + t_d)$$

$t_a$=acceleration time
$t_d$=deceleration time
$t_s$=slew time (constant velocity)
$t$=current time
$tt=(t_a+t_2+t_d-t)$
$pi=3.1417$

SYSTEM CONTROL BOARD

The system control board 500 includes electronic circuitry that provides for executing system level functions in the case where the basic robot control is to be expanded to achieve a shorter trajectory cycle time or to achieve other higher level performance. As described elsewhere in this writeup or in the group of incorporated by reference patent applications, such expansion is conveniently configured by simply plugging the system control board 500 into the AIF board 800. The system control board 500 accordingly is provided with VME bus interface circuitry for this purpose.

Thus, the system control board microprocessor circuitry enables execution of the system level software in accordance with the user's robot program. As described in connection with the servo control board (SCM) 400, the system level motion software includes a planning program that generates time profiles for each move commanded by the robot program and a trajectory program for interpolating system cycle moves from the program command move, i.e., for generating position commands for the robot axes each system cycle.

Figure 7:
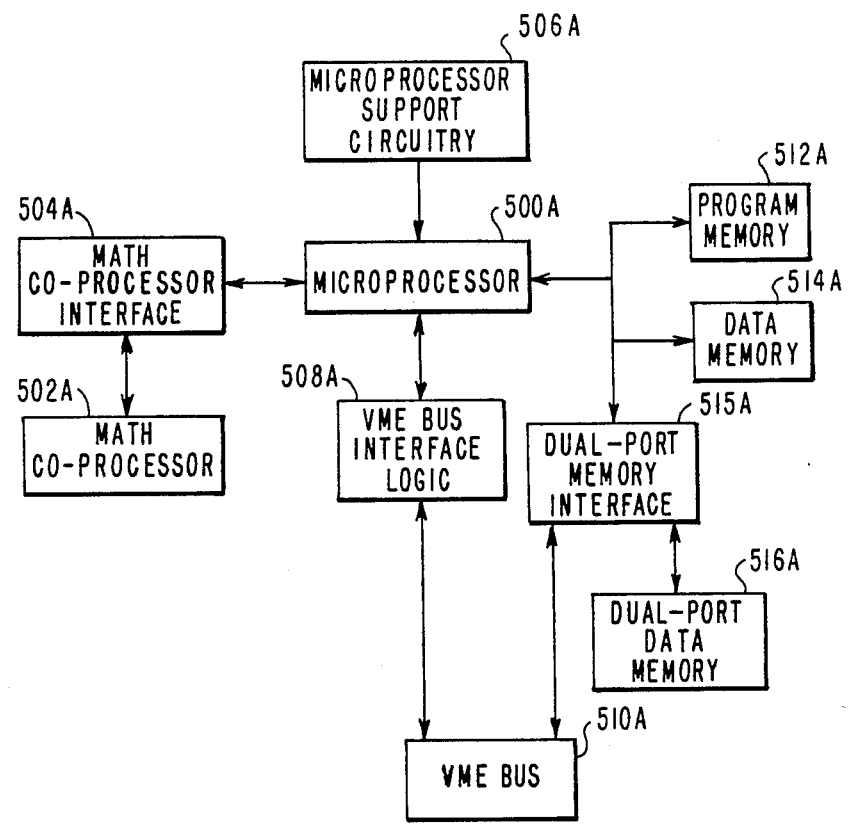
FIG. 7 shows a schematic diagram of a system control board which is also shown in FIG. 5A and provides an optional extension of the basic robot control.

As generally shown in FIG. 7, the system control board 500 of FIG. 4 employs a system control microprocessor 500A and a floating point math coprocessor 502A. The microprocessor 500A preferably is a Motorola 68000 which has high data processing capability. The calculator coprocessor 502A is preferably a National Semiconductor 16081 or Motoroloa 68801 which has floating point computational capability. An interface 504A couples the microprocessor 500A and the math coprocessor 502A.

Support circuitry 506A is provided for the processor 500A. It generally includes an interrupt structure, clock and reset circuits and bus error circuitry. Interface circuitry 508A couples the system control manager 500A to the VME bus 510A.

The microprocessor 500A generally operates as a planning and trajectory manager in executing the system motion programming. Data is moved to and from program memory 512A and data memory 514A and a dual port memory 516A for interboard data transfers and to and from the VME bus as required. Program steps requiring calculations are executed in the microprocessor and predetermined calculations are exported to calculator 502A.

SYSTEM CONTROL BOARD CIRCUITRY

The circuitry for the system control board is shown in greater detail in FIGS. 9A-1 through 9D-4.

Figures 1, 9A:
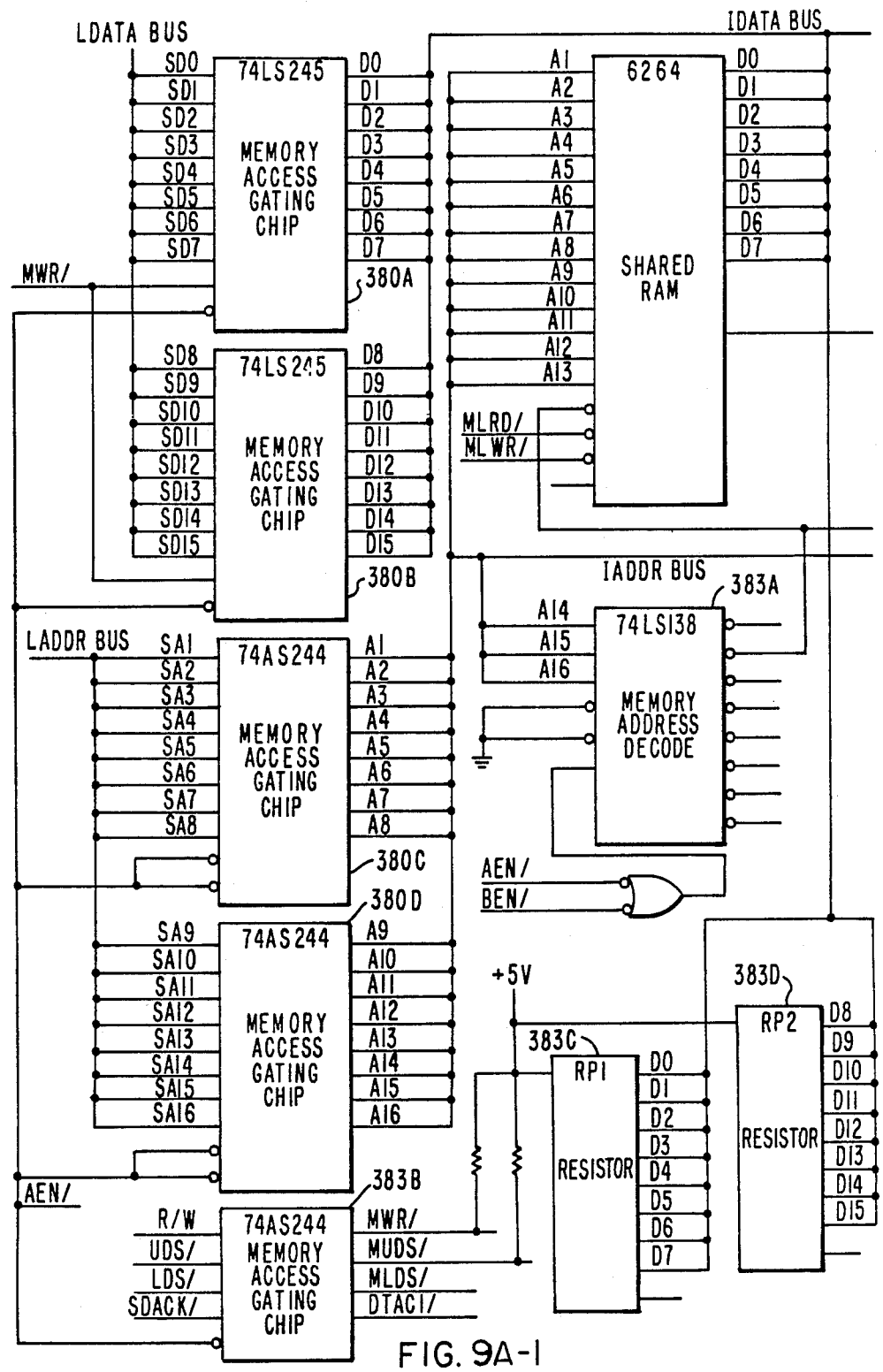
Figures 2, 9A:
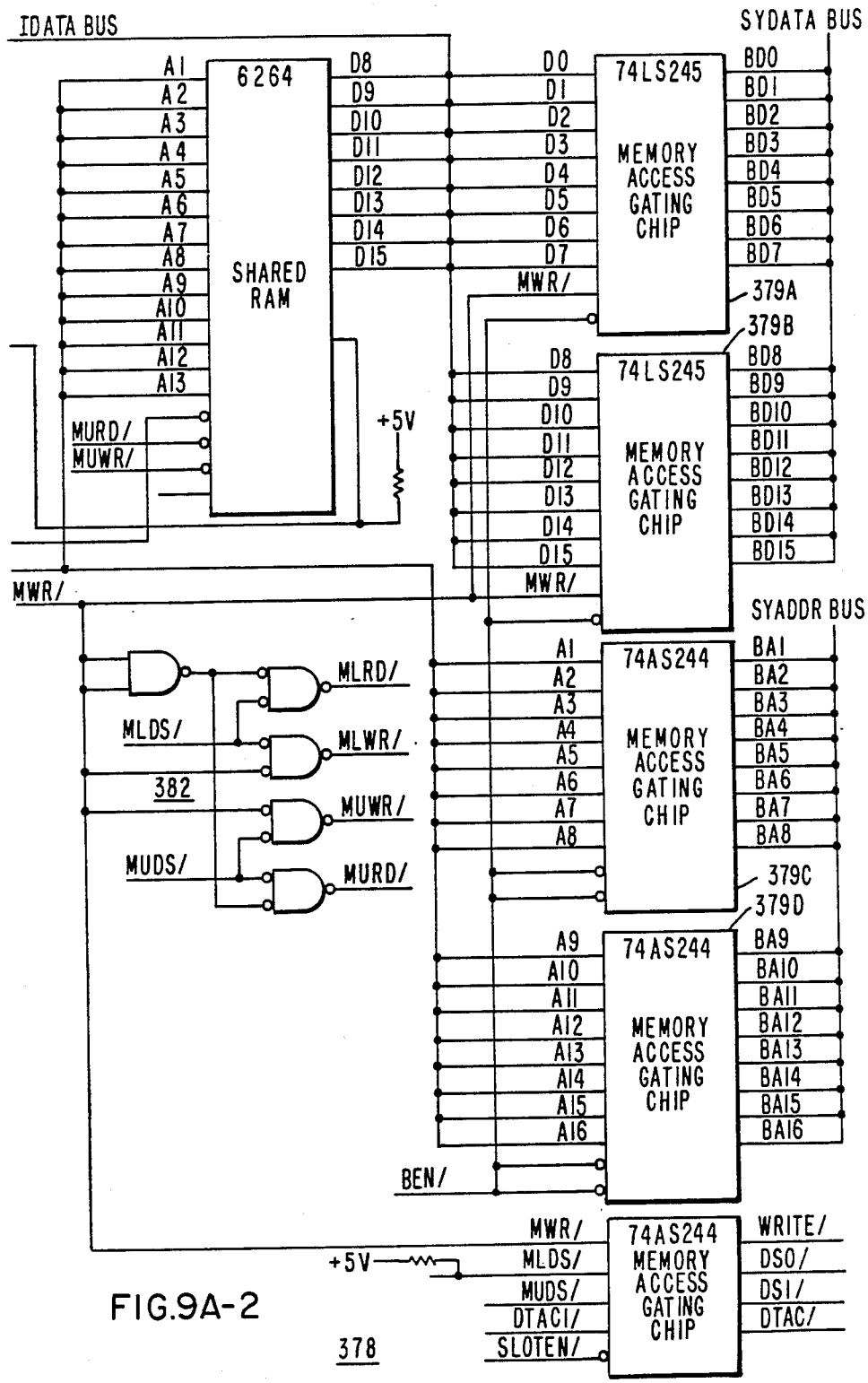
Figures 1, 9B:
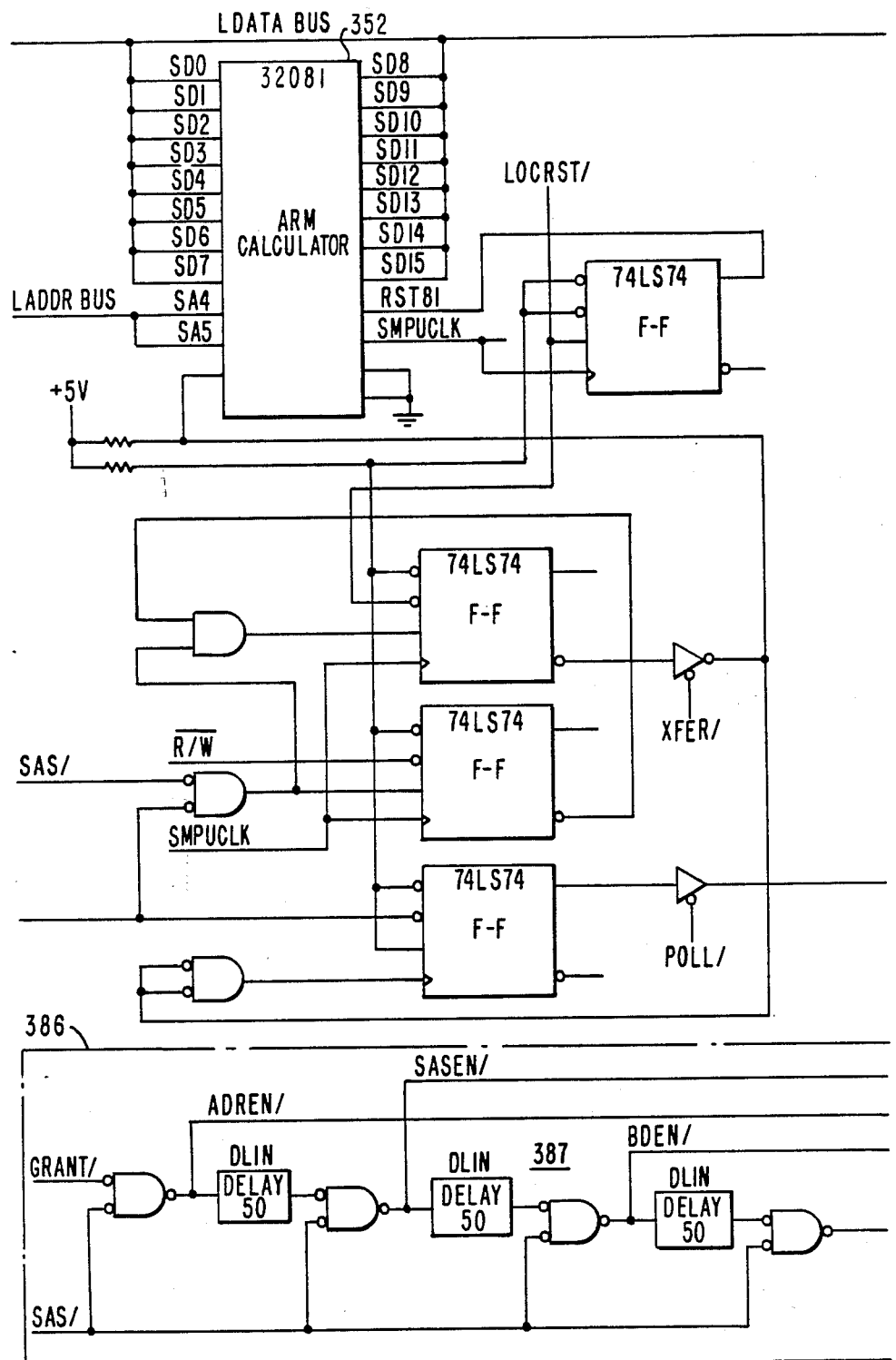
Figures 2, 9B:
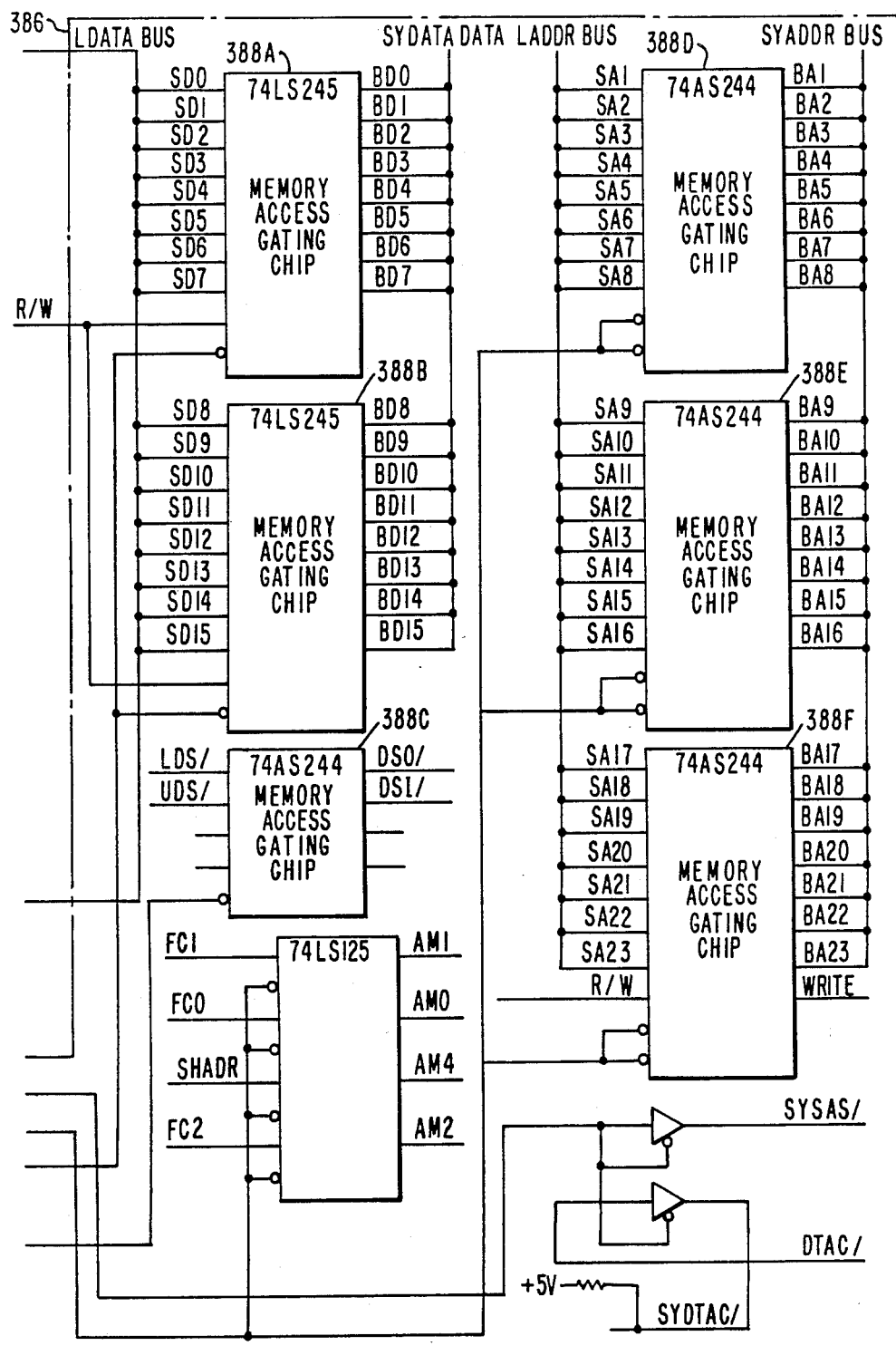
Figures 1, 9C:
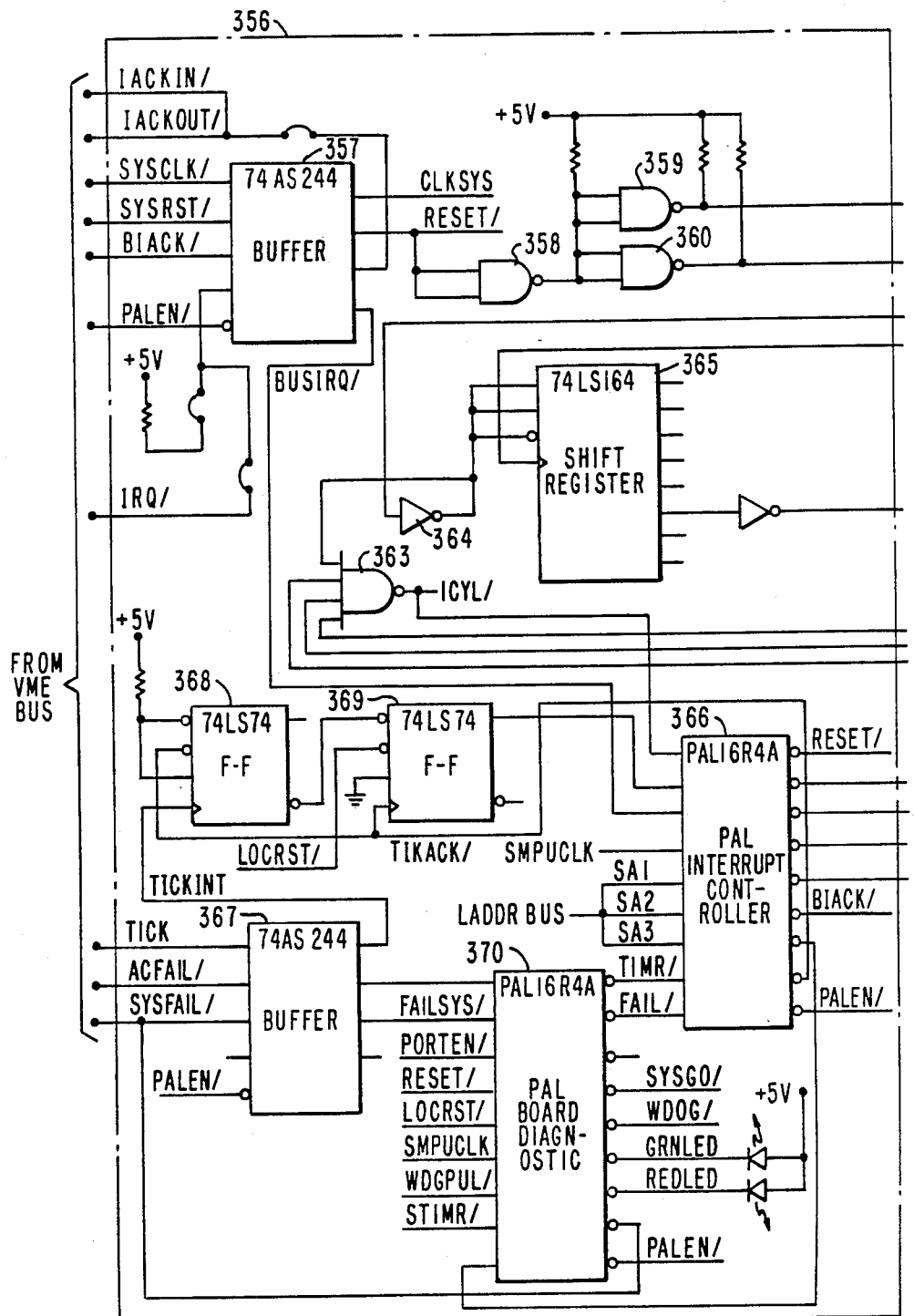
Figures 2, 9C:
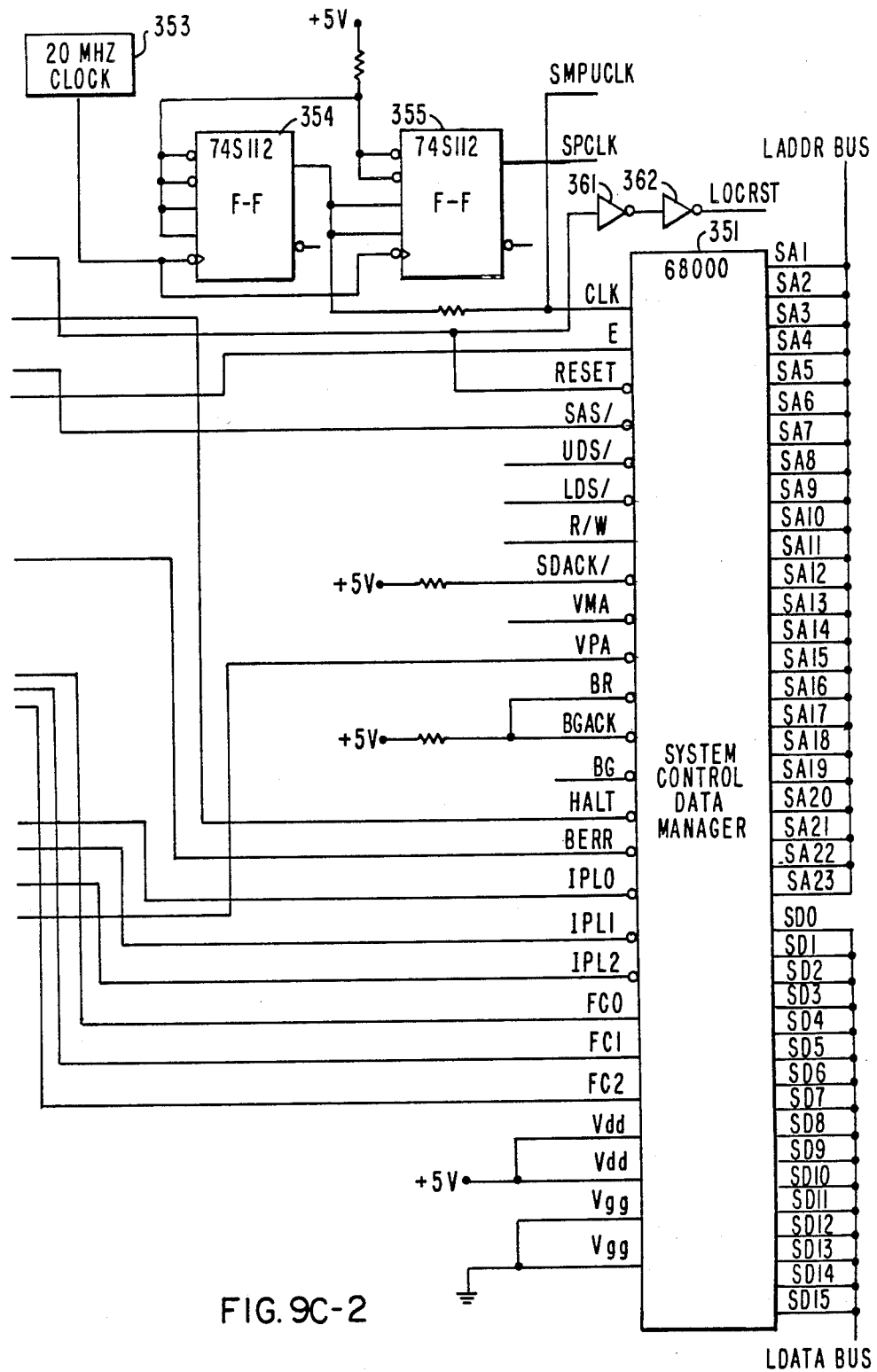
Figures 3, 9C:
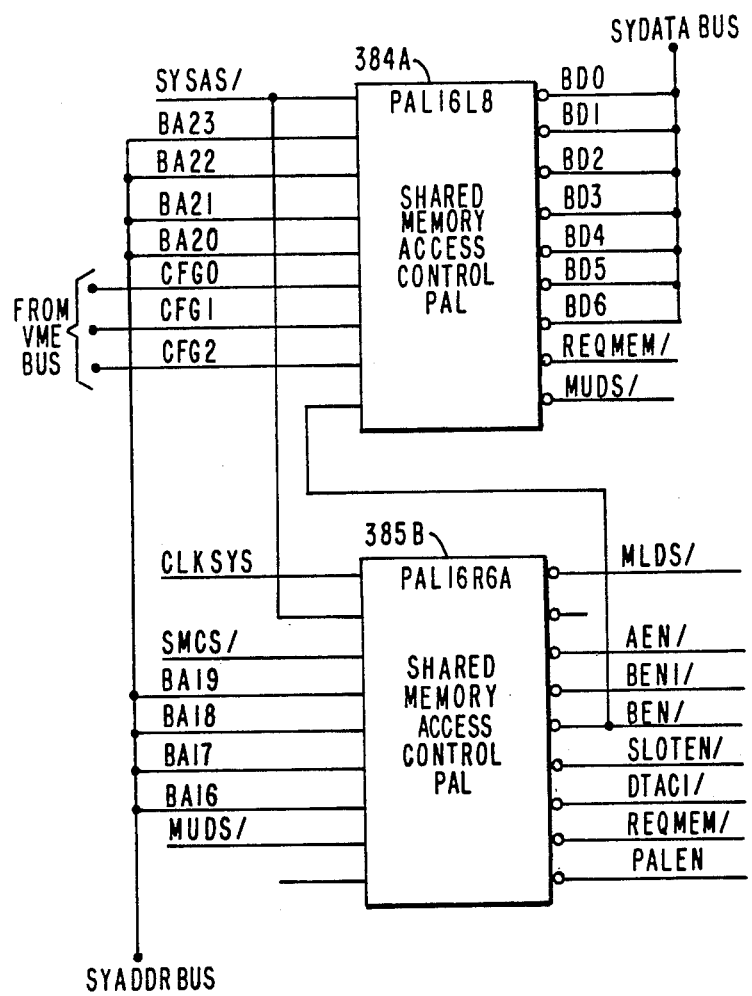
Figures 4, 9C:
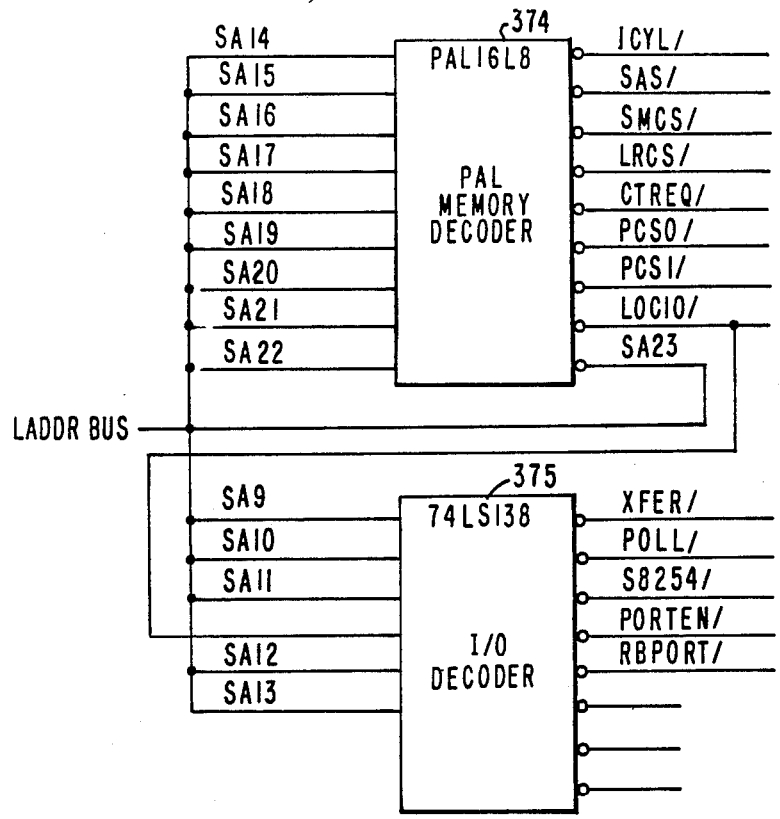
Figures 5, 9C:
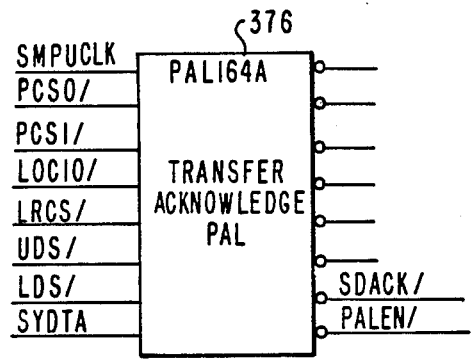

The system control data manager 500A is shown in FIG. 9C2 along with clock generator/driver circuitry used to provide computer system hardware timing. The timing circuitry includes a clock 353, flip-flops 354 and 355 and drivers 361 and 362.

Program memory chips 371A, 371B, 371C and 371D provide program storage for the system control data manager. Motion software including the planning and trajectory programs is stored in the program memory. User (robot) program memory is stored on a user memory chip on the SCM board 400 and it is accessed over the VME bus. Special large extra user memory boards are employed for large user programs.

Figures 1, 9D:
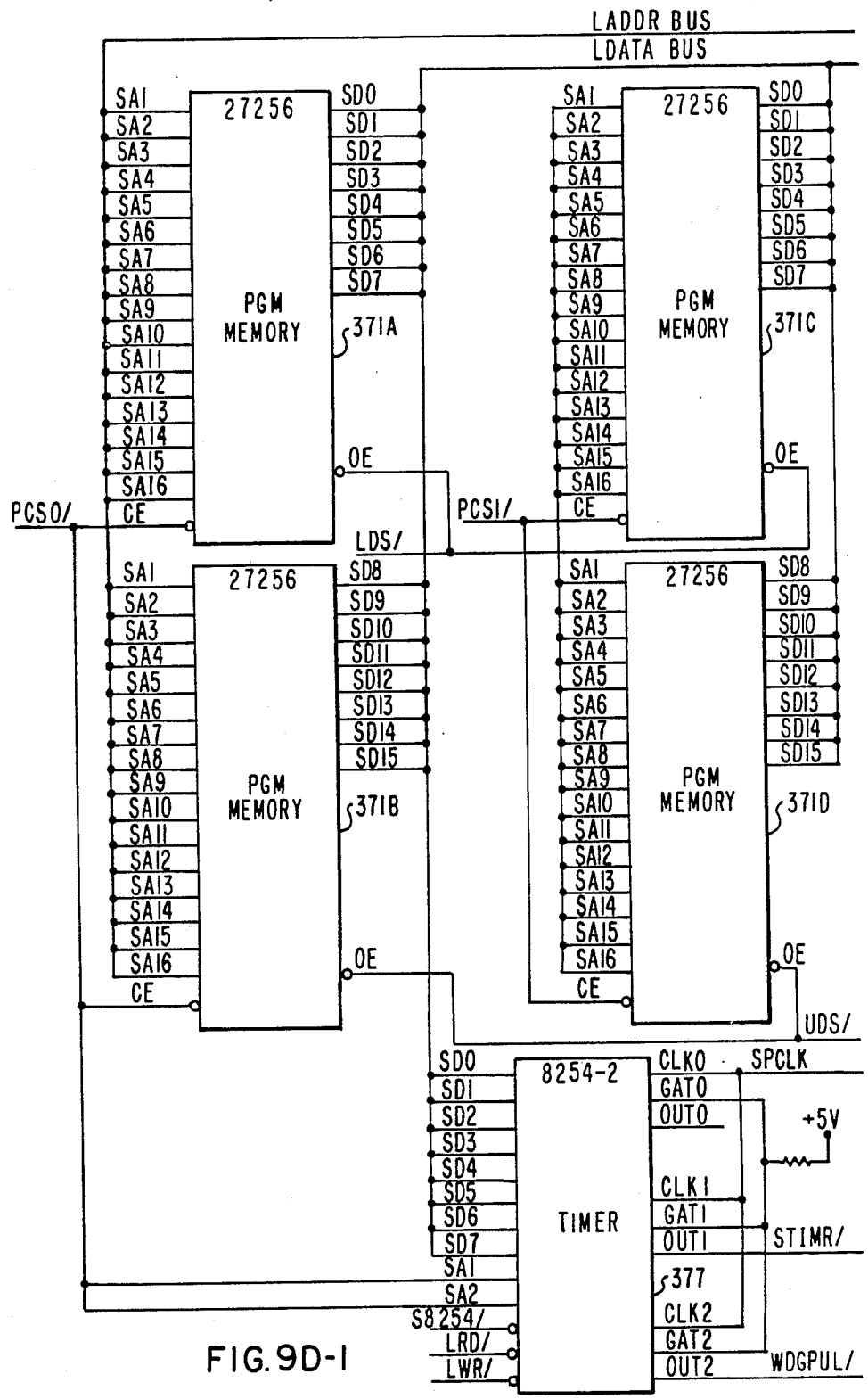
Figures 2, 9D:
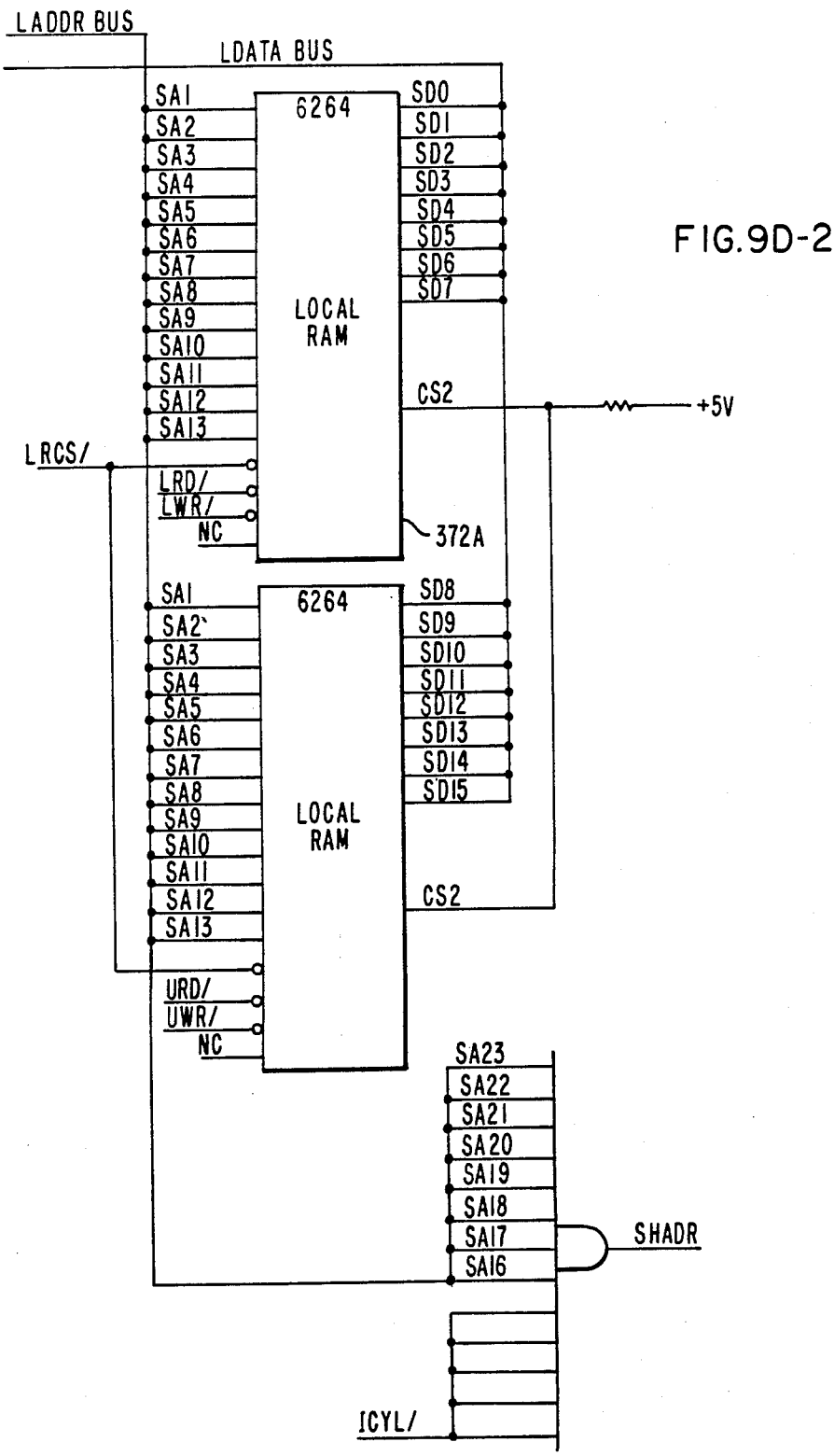
Figures 3, 9D:
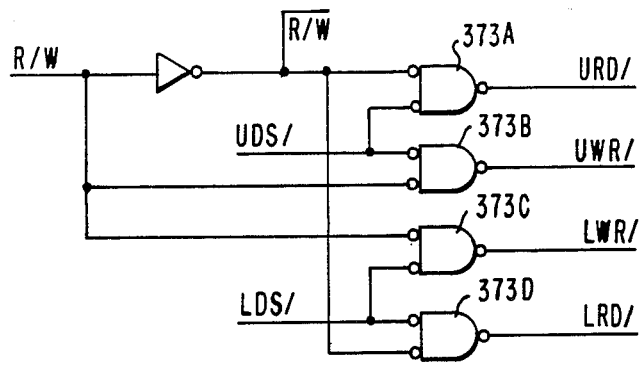
Figures 4, 9D:
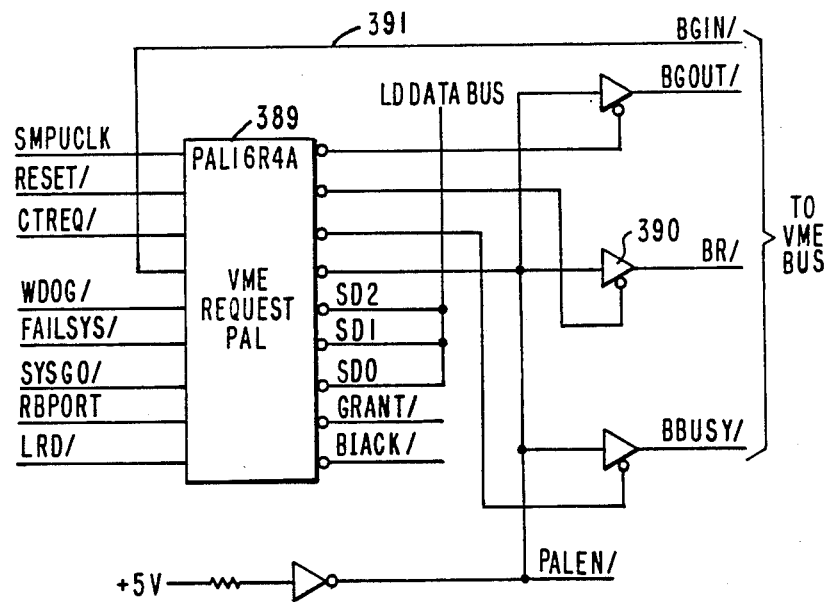

Local RAM memory chips 6264 are provided for the system control data manager as shown in FIGURE. PAL decoders 374 and 375 shown in FIG. 9C-4 are used by the microprocessor to move data into and out of memory. An acknowledge PAL 376 sends acknowledgements to the microprocessor on data transfers. In FIG. 9D-3, there is shown a read/write control for the local memory including logic elements 373A through 373D.

Shared memory interfaces the system control data manager with the VME bus as shown in FIG. 9A-1, 9A-2 and 9C-3. It includes memory access gating chips 379A through 379D in FIG. 9A-2 and 380A through 380D in FIG. 9A-1 and two 6264 shared RAM chips coupled to the system data bus and the local data bus. Memory access gating chips 388A, 388B, and 388D-F operate with the system address bus and the local data bus. A PAL 389 (FIG 9D-4) is used to process VME bus requests through circuit 387 (FIG. 9B-1). Access control PALS 384A and 385B control the transfer of data between the system control microprocessor and the VME bus.

A software timer 8254-2 (FIG. 9D-1) generates software timing signals including a general purpose signal STIMR and a watchdog signal WDGPUL that is applied to an on board diagnostic PAL 370 (FIG. 9C-1).

Interrupt interface circuitry includes the diagnostic PAL 370 and a PAL interrupt controller 366. A buffer 367 and flip-flops 368 and 369 are also included.

Initialization circuitry for the system control data manager includes logic elements 358, 359 and 360 that operate from a buffer 357. A shift register 365 generates a bus error signal if the microprocessor enters a memory access loop for a memory location that does not exist.

The arm calculator coprocessor is shown in FIG. 9B-1. Circuitry that interfaces it to the system control microprocessor includes three flip-flops 74LS74.

For more detail on the torque processor board 600, reference is made to Ser. No. 932,976.

For more detail on the arm interface board 800, reference is made to Ser. Nos. 932,982, 932,841 and 932,975.

What is claimed is:

1. A robot comprising:
    an arm having a plurality of joints;
    each of said joints having an electric motor drive;
    a power amplifier operable to supply drive current to each motor;
    respective digital feedback control loop means for respectively controlling said power amplifiers for said joint motors;
    means for generating digital motor current, position and velocity feedback signals for said control loop means;
    each of said digital feedback control loop means including digital position and velocity control loops;
    each of said feedback control loop means further including a digital torque control loop responsive to torque commands from said position and velocity control loops to generate voltage commands for operating the associated power amplifier and joint motor;
    system resource means providing general support for the operation of said digital feedback control loop means and including data communicating means for interfacing with local input/output devices and other systems and devices;
    first microprocessor servo means coupled to said system resource means and generating said voltage commands in response to position commands and said current, position and velocity feedback signals;
    means for generating said position commands in accordance with predetermined moves set forth in a robot program;
    said position command generating means including planning program means for generating a motion profile with specified motion parameters for implementing each robot program command;
    said position command generating means further including trajectory program means for generating said position commands to satisfy each robot program command in accordance with its motion profile;
    second microprocessor means adapted to be coupled to said system resource means;
    said position command generating means further including said first microprocessor servo means for execution of said planning and trajectory program means in a basic control configuration for said robot or said second microprocessor means for execution of said planning and trajectory program means in an expanded performance control configuration for said robot; and
    interfacing memory means for coupling said first and second microprocessor means for data communications therebetween when the expanded control configuration is employed.

2. A robot as set forth in claim 1 wherein program memory means are provided for storing said planning and trajectory program means for loading into either of said microprocessor means.

3. A robot as set forth in claim 2 wherein said system resource means includes said program memory means.

4. A robot as set forth in claim 1 wherein said communication means includes a DMA controller for managing and executing data communications for the robot control loop means thereby freeing said microprocessor means from corresponding communications load burden.

5. A robot as set forth in claim 1 wherein said interfacing memory means is a dual port memory.

6. A robot as set forth in claim 1 wherein said system resource means includes said interfacing memory means.

7. A robot as set forth in claim 4 wherein said system resource means includes said interfacing memory means and means are provided for arbitrating in accordance with predetermined rules access to specific facilities within said system resource means by said first and second microprocessor means and said DMA controller.

8. A digital control for a robot having a plurality of arm joints, and said control comprising:
    an electric motor for driving each of the robot arm joints;
    a power amplifier operable to supply drive current to each motor;
    respective digital feedback control loop means for respectively controlling said power amplifiers for said joint motors;
    means for generating digital motor current, position and velocity feedback signals for said control loop means;
    each of said digital feedback control loop means including digital position and velocity control loops;
    each of said feedback control loop means further including a digital torque control loop responsive to torque commands from said position and velocity control loops to generate voltage commands for operating the associated power amplifier and joint motor;
    system resource means providing general support for the operation of said digital feedback control loop means and including data communicating means for interfacing with local input/output devices and other systems and devices;
    first microprocessor servo means coupled to said system resource means and generating said voltage commands in response to position commands and said current, position and velocity feedback signals;
    means for generating said position commands in accordance with predetermined moves set forth in a robot program;
    said position command generating means including planning program means for generating a motor profile with specified motion parameters for implementing each robot program command;

said position command generating means further including trajectory program means for generating said position commands to satisfy each robot program command in accordance with its motion profile;

second microprocessor means adapted to be coupled to said system resource means;

said position command generating means further including said first microprocessor servo means for execution of said planning and trajectory program means in a basic control configuration for said robot or said second microprocessor means for execution of said planning and trajectory program means in an expanded performance control configuration for said robot; and interfacing memory means for coupling said first and second microprocessor means for data communications therebetween when the expanded control configuration is employed.

9. A digital robot control as set forth in claim 8 wherein program memory means are provided for storing said planning and trajectory program means for loading into either of said microprocessor means.

10. A digital robot control as set forth in claim 9 wherein said system resource means includes said program memory means 11. A digital robot control as set forth in claim 8 wherein said communication means includes a DMA controller for managing and executing data communications for the robot control loop means thereby freeing said microprocessor means from corresponding communications load burden.

12. A digital robot control as set forth in claim 8 wherein said interfacing memory means is a dual port memory.

13. A digital robot control as set forth in claim 8 wherein said system resource means includes said interfacing memory means.

14. A digital robot control as set forth in claim 11 wherein said system resource means includes said interfacing memory means and means are provided for arbitrating in accordance with predetermined rules access to specific facilities within said system resource means by said first and second microprocessor means and said DMA controller.

15. A digital robot control as set forth in claim 10 wherein said system resource means further includes said interfacing memory means, nonvolatile data memory means, and clock means for system time stamping.

16. A digital robot control as set forth in claim 15 wherein said system resource means further includes at least one additional dual channel communication controllers to provide at least two additional asynchronous communication channels.

17. A digital robot control as set forth in claim 8 wherein said first microprocessor servo means includes a position/velocity microprocessor servo means for executing said program means in the basic control configuration and for operating the position/velocity control loops and generating torque commands, and wherein said first microprocessor servo means further includes a torque processor servo means for operating the torque control loop and generating said voltage commands.

18. A digital robot control as set forth in claim 17 wherein said position/velocity microprocessor servo means includes a data management processor and a position/velocity control calculator microprocessor and a floating point calculator coordinated by said management microprocessor to perform the defined position/velocity servo means functions.

* * * * *